(12) United States Patent
Grobnic et al.

(10) Patent No.: US 7,187,818 B2
(45) Date of Patent: Mar. 6, 2007

(54) PACKAGING FOR PLANAR LIGHTWAVE CIRCUITS

(75) Inventors: Amelia Georgeta Grobnic, Ottawa (CA); Robert James, Gatincau (CA)

(73) Assignee: Her Majesty the Queen in right of Canada, as represented by the Minister of Industry, through the Communications Research Centre Canada, Ottawa (CA)

( * ) Notice: Subject to any disclaimer, the term of this patent is extended or adjusted under 35 U.S.C. 154(b) by 55 days.

(21) Appl. No.: 11/034,818

(22) Filed: Jan. 14, 2005

(65) Prior Publication Data
US 2005/0157973 A1 Jul. 21, 2005

Related U.S. Application Data

(60) Provisional application No. 60/536,708, filed on Jan. 16, 2004.

(51) Int. Cl.
G02B 6/12 (2006.01)
(52) U.S. Cl. ...................................................... 385/14
(58) Field of Classification Search ................. 385/14, 385/129–133
See application file for complete search history.

(56) References Cited

U.S. PATENT DOCUMENTS

| 4,756,627 | A | * | 7/1988 | Nelson ........................ 374/159 |
| 5,694,503 | A | * | 12/1997 | Fleming et al. ................ 385/37 |
| 5,978,539 | A | | 11/1999 | Davies et al. ................ 385/129 |
| 6,337,932 | B1 | * | 1/2002 | Suhir ............................ 385/13 |
| 6,370,310 | B1 | * | 4/2002 | Jin et al. ...................... 385/136 |
| 6,477,308 | B2 | | 11/2002 | Hattori et al. ............... 385/129 |
| 6,519,380 | B2 | | 2/2003 | Dawes et al. .................. 385/14 |
| 6,542,682 | B2 | * | 4/2003 | Cotteverte et al. ........... 385/125 |
| 6,542,685 | B1 | | 4/2003 | Yoneda ........................ 385/130 |
| 6,574,409 | B1 | | 6/2003 | Moroni et al. ............... 385/129 |
| 6,603,916 | B1 | | 8/2003 | McGreer et al. ............. 385/129 |
| 2003/0152353 | A1 | * | 8/2003 | Inoue et al. ................. 385/129 |

\* cited by examiner

Primary Examiner—Ellen E. Kim
(74) Attorney, Agent, or Firm—Teitelbaum & MacLean; Neil Teitelbaum; Doug MacLean

(57) ABSTRACT

A planar lightwave circuit device includes one or more planar lightwave circuits (PLCs) each having an optical layer deposited on a substrate, and a package base including one or more support structures for suspending the planar lightwave circuit above a portion of the package base. Each substrate has a first coefficient of thermal expansion, whereas the package base has a second coefficient of thermal expansion. The first and second coefficients of thermal expansion differ such that a change in temperature causes the support to apply one of a compressive and a tensile force to the planar lightwave circuit in a plane within or parallel to the plane of the planar lightwave circuit. The induced stress can modify the optical performance of the PLC device, e.g. to reduce the temperature sensitivity of the device and thus maintain device performance, or for providing efficient passive or dynamic tuning of the device.

30 Claims, 23 Drawing Sheets

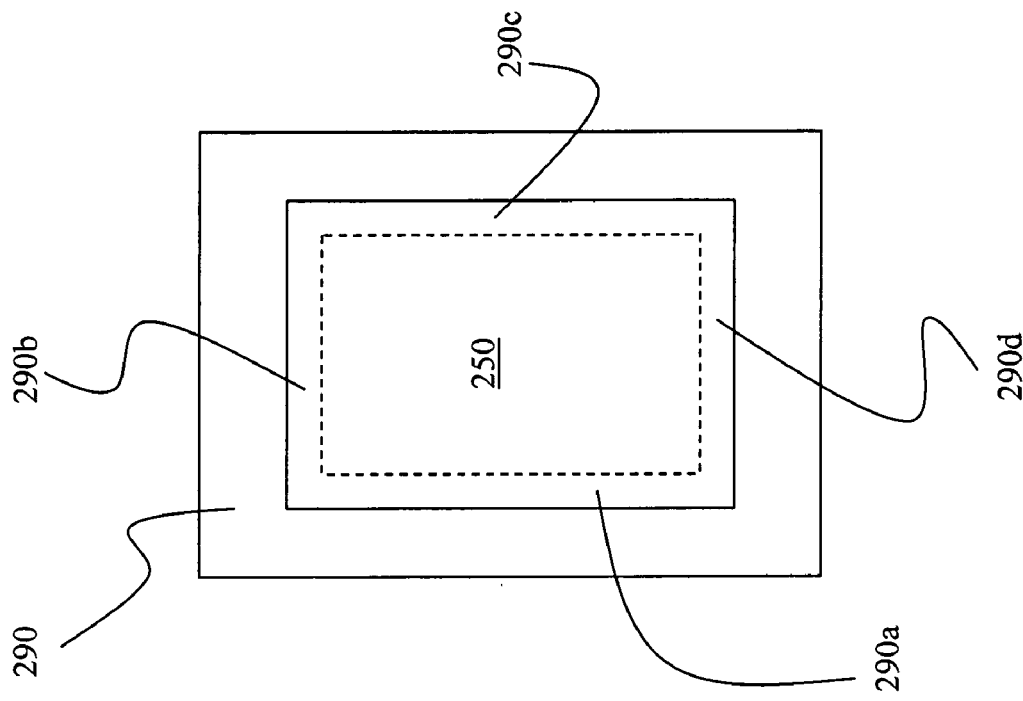
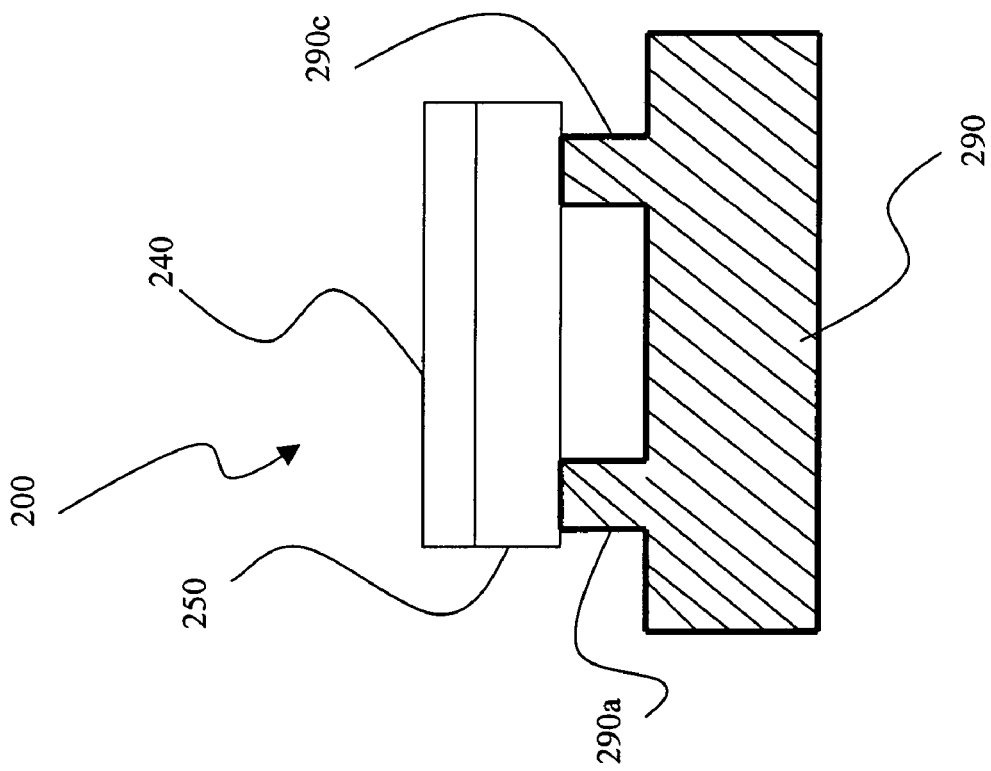

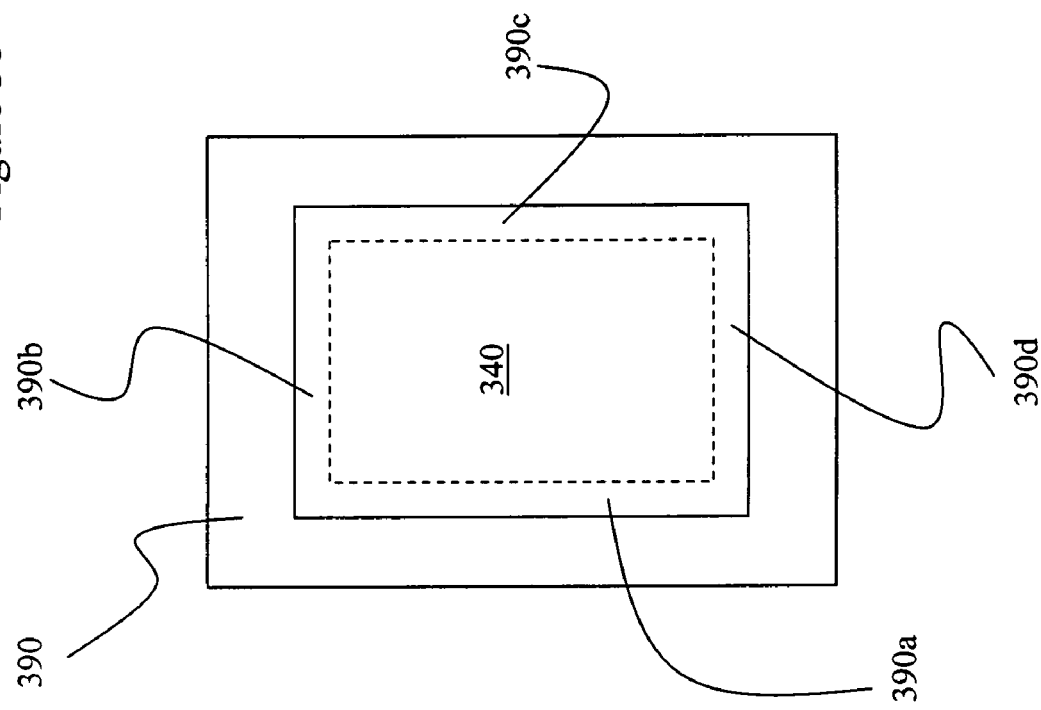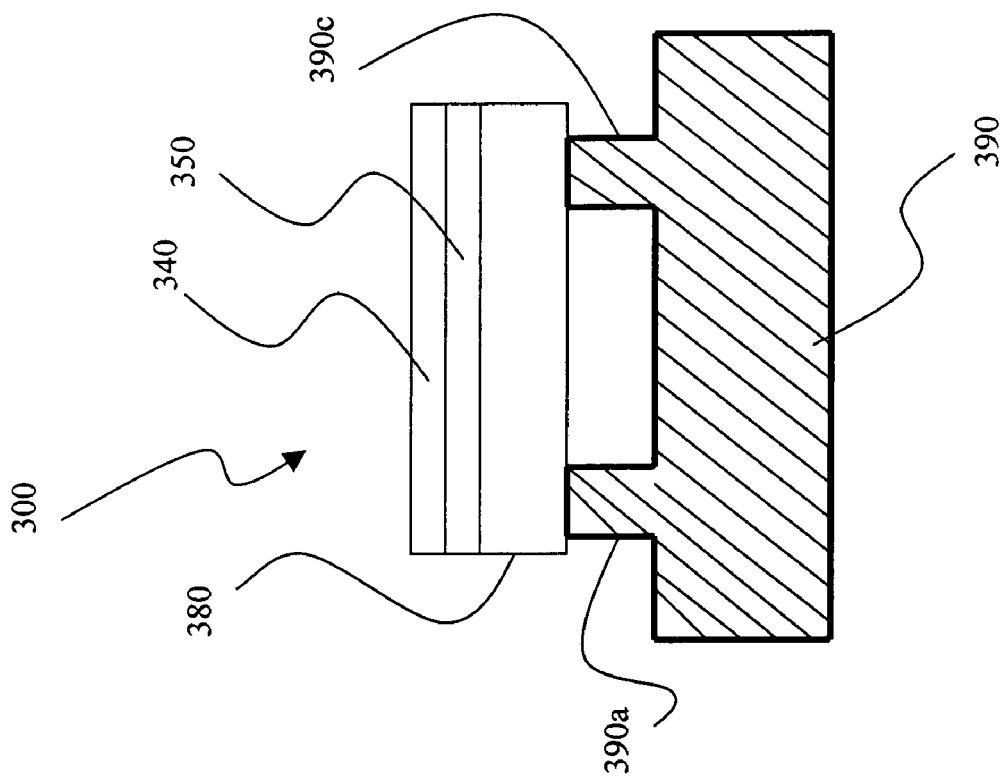

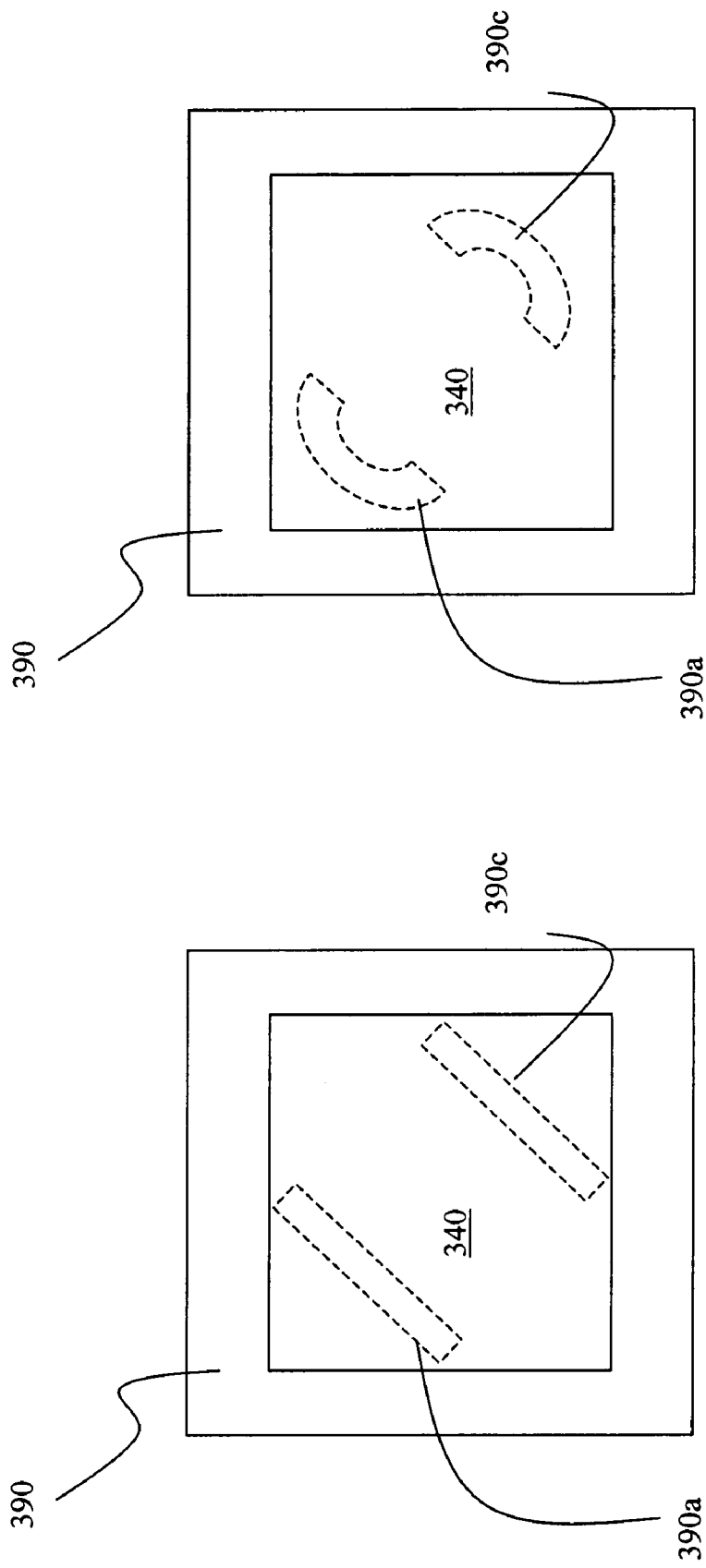

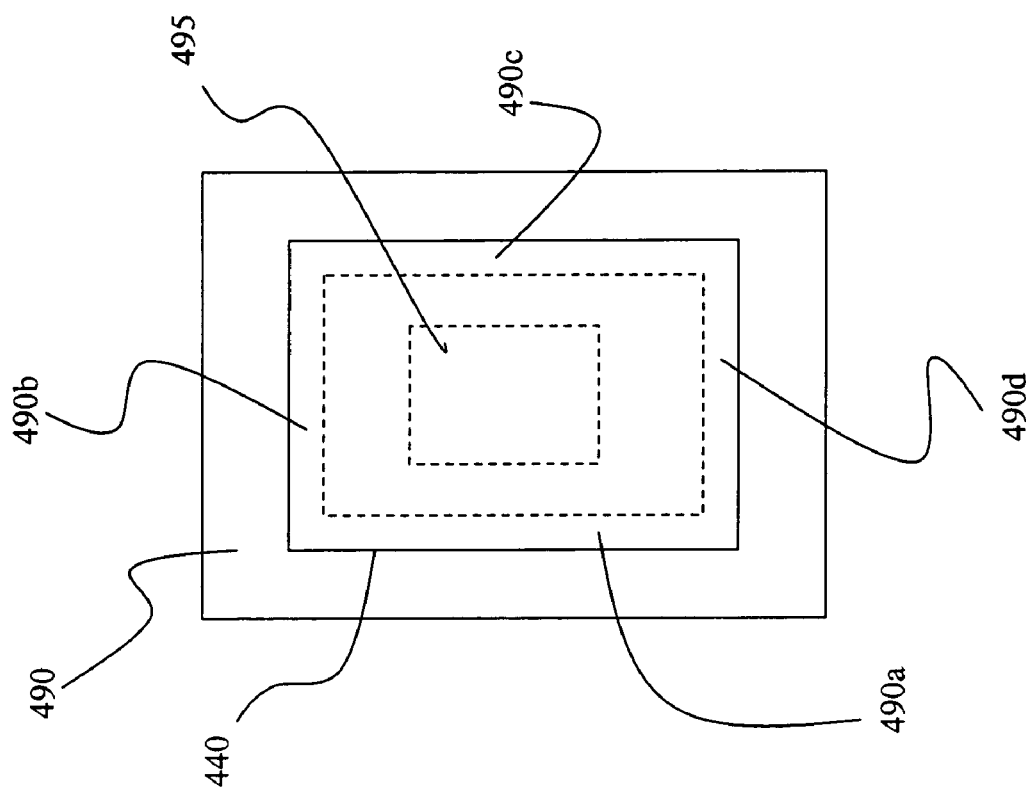
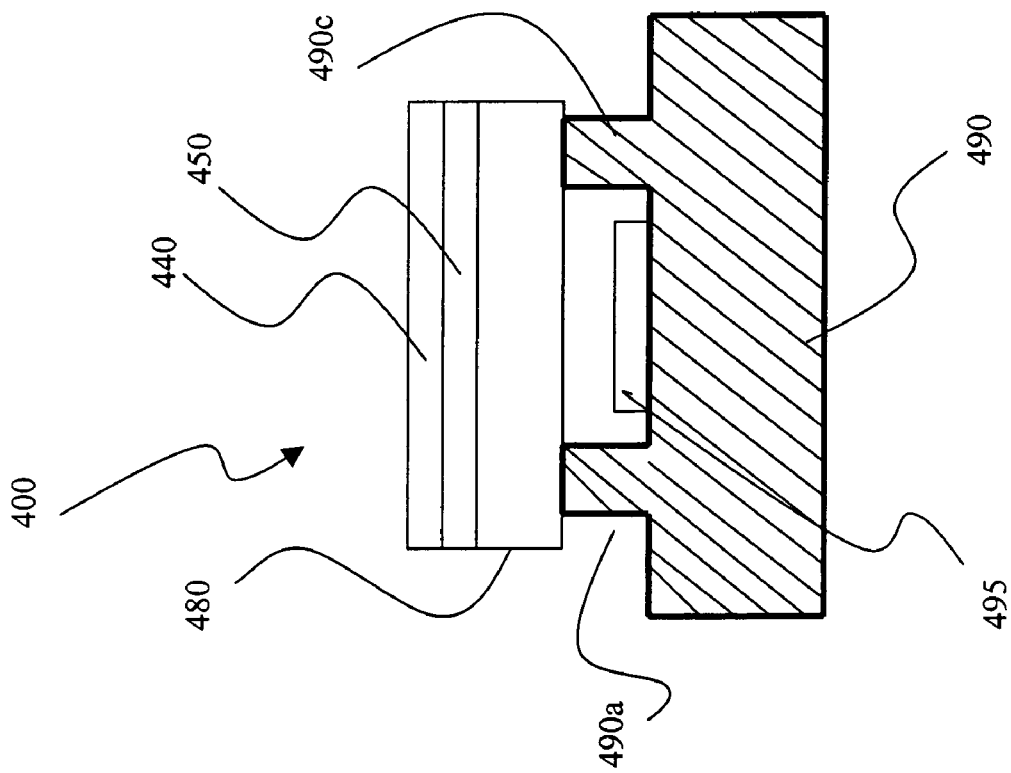

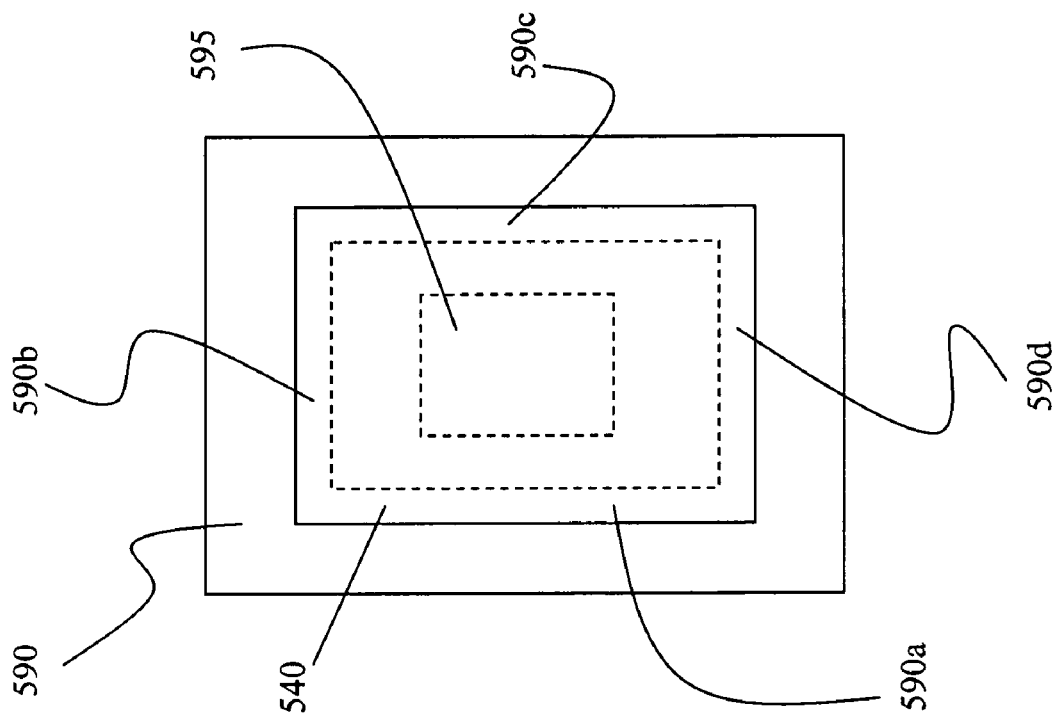
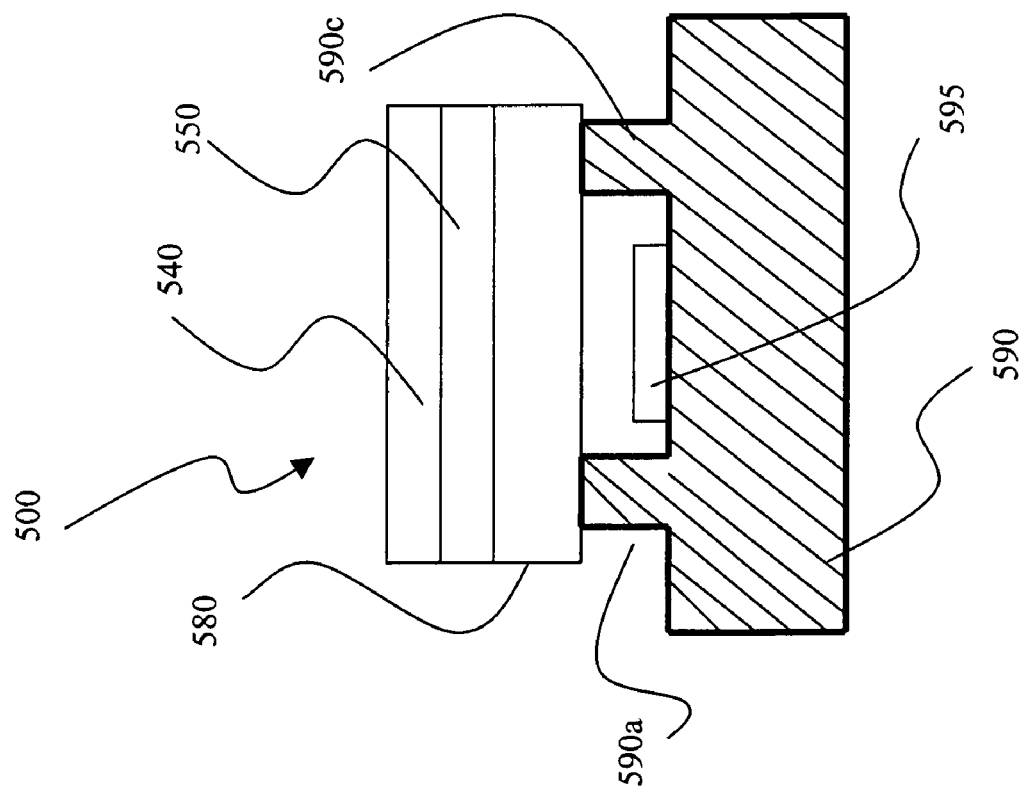

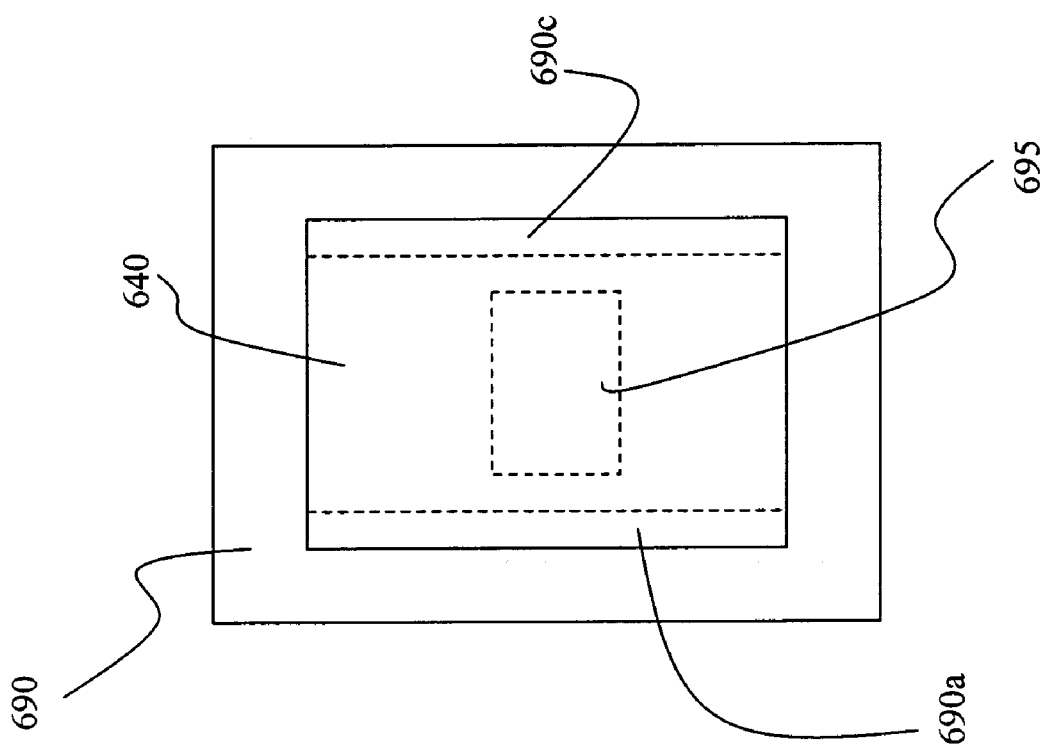
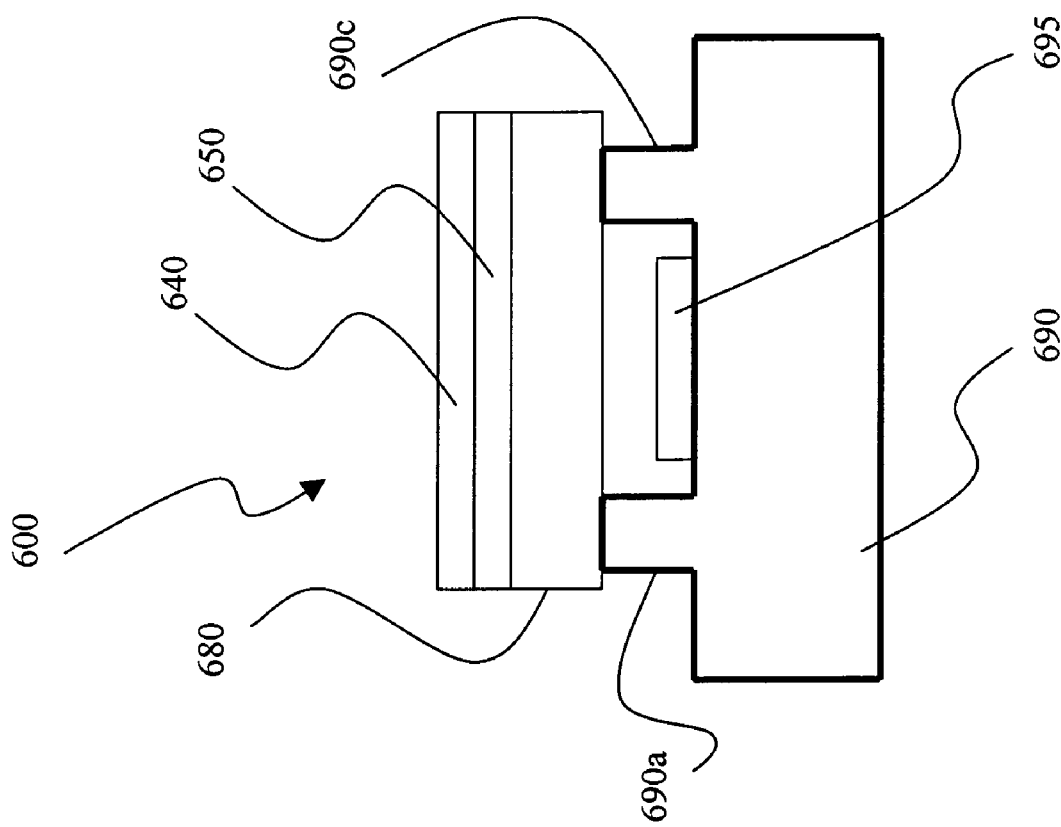
Figure 6b
Figure 6a

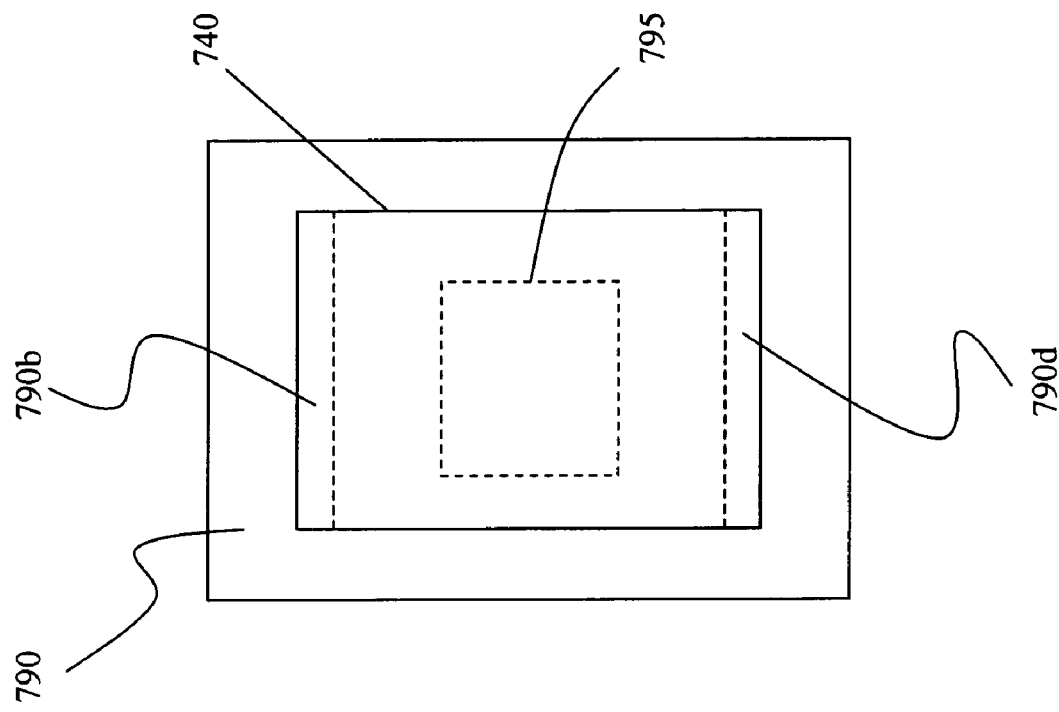
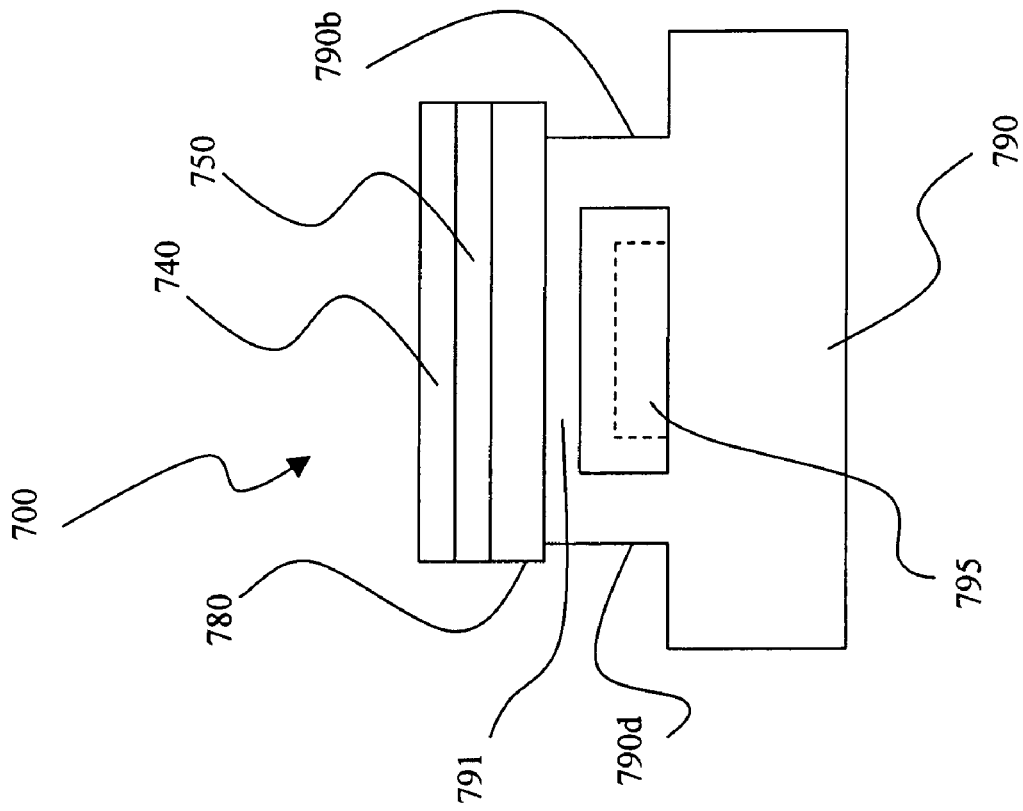

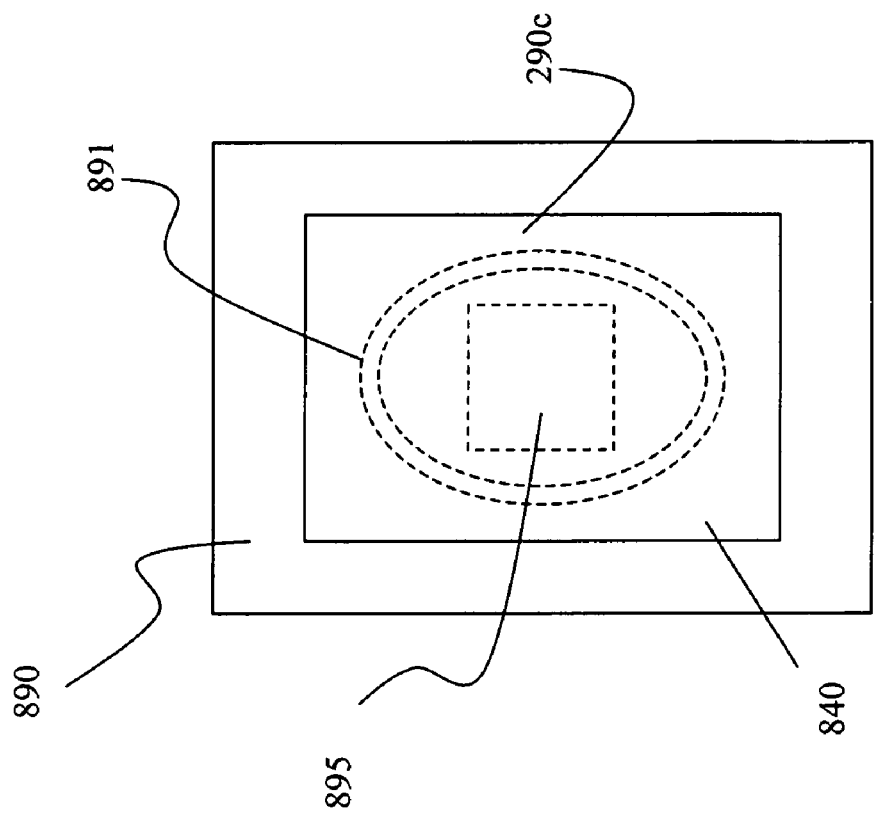
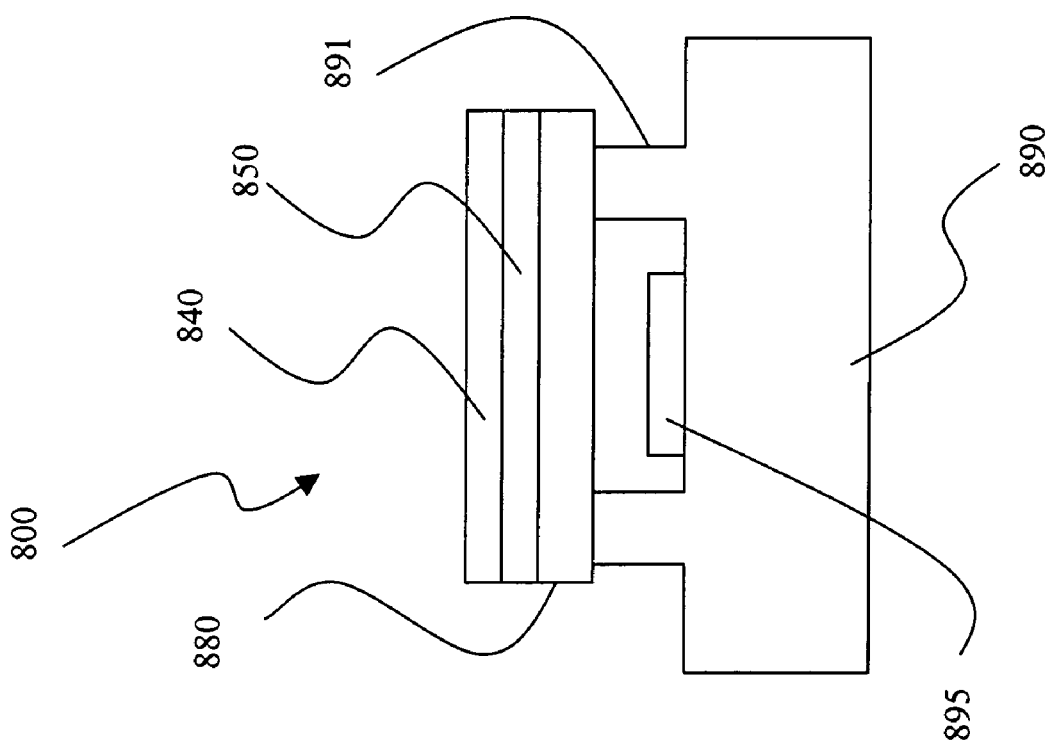

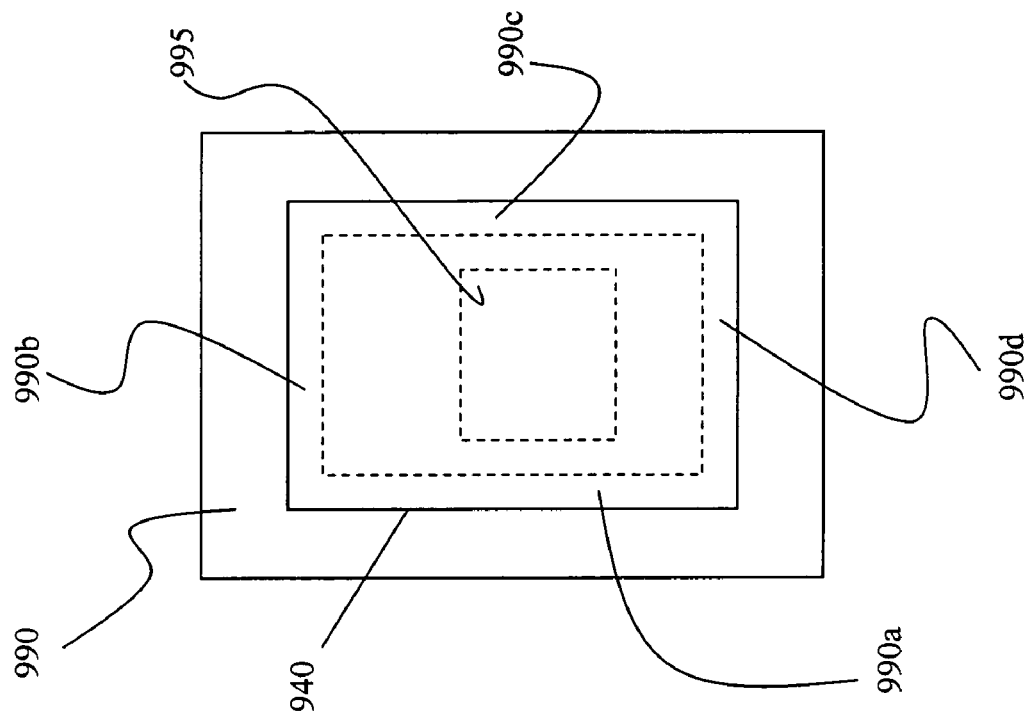
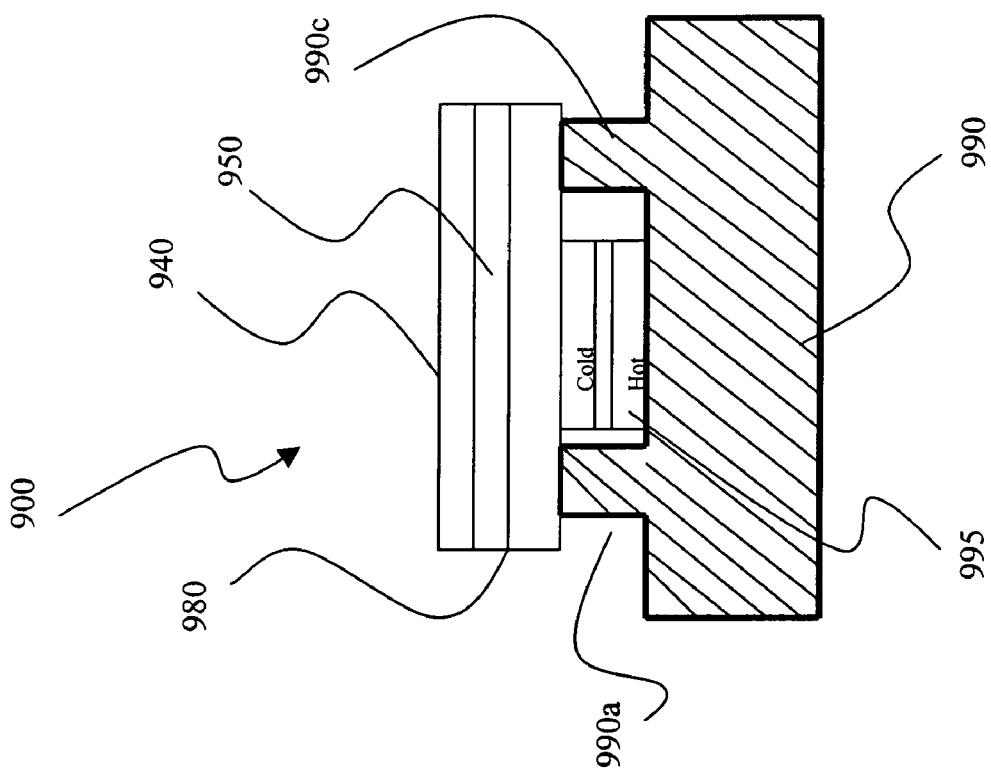

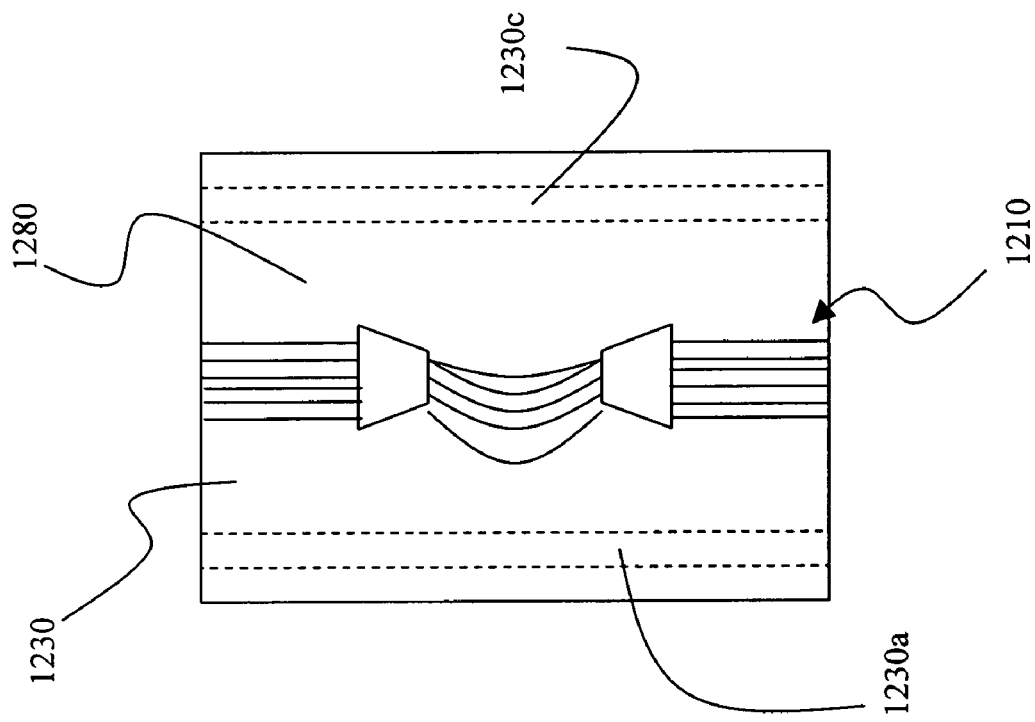
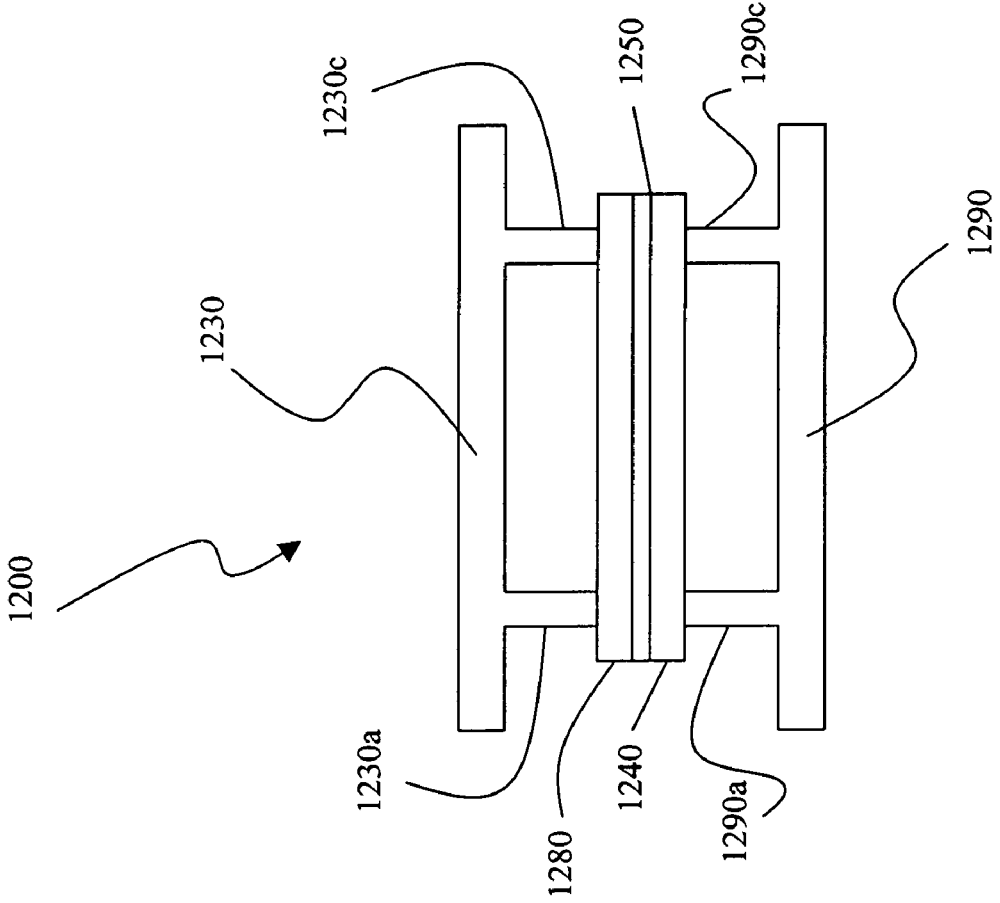

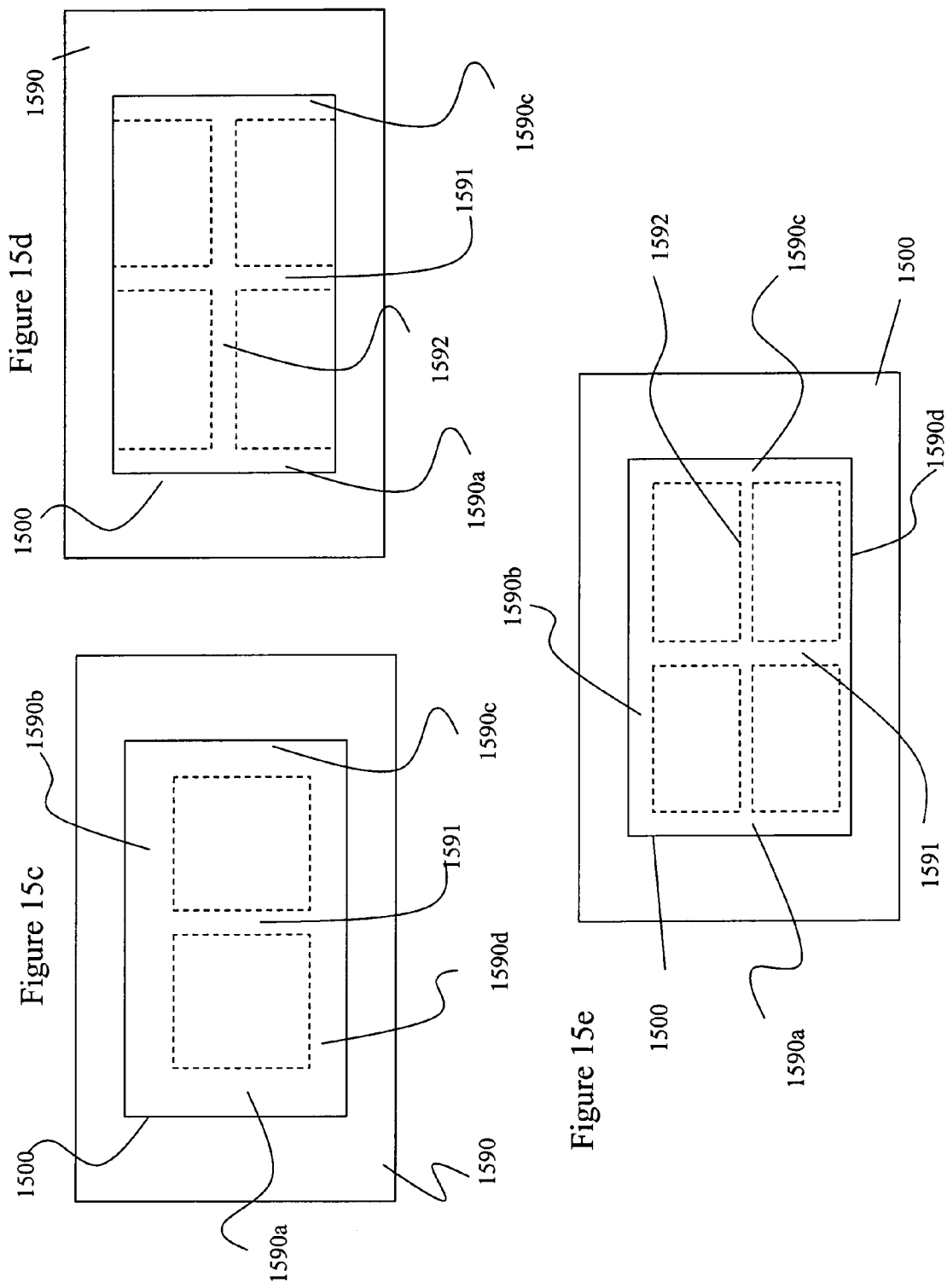

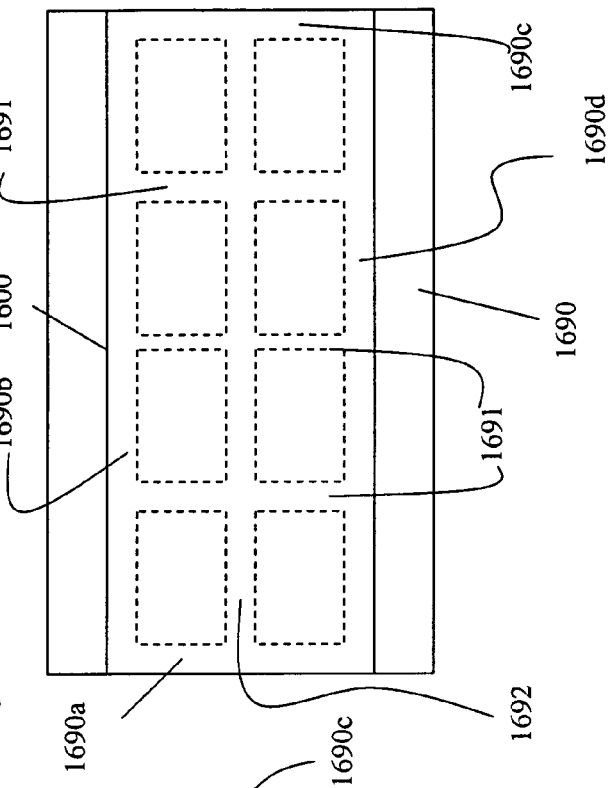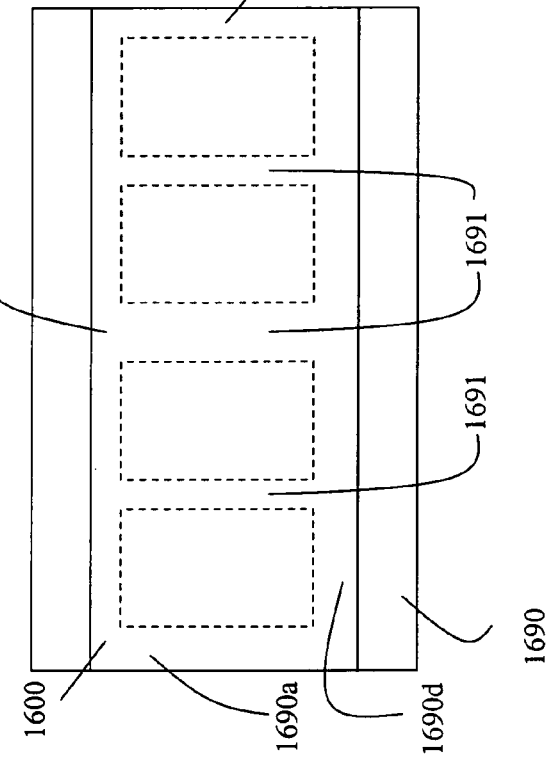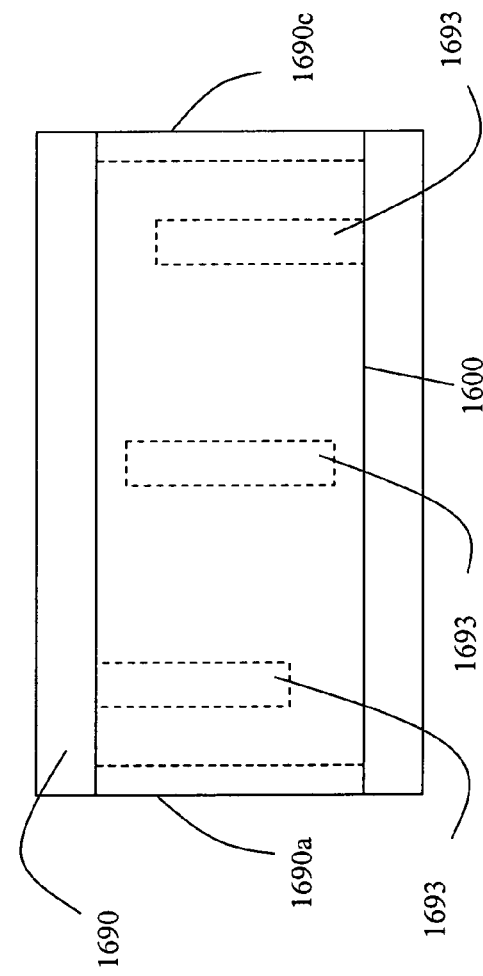

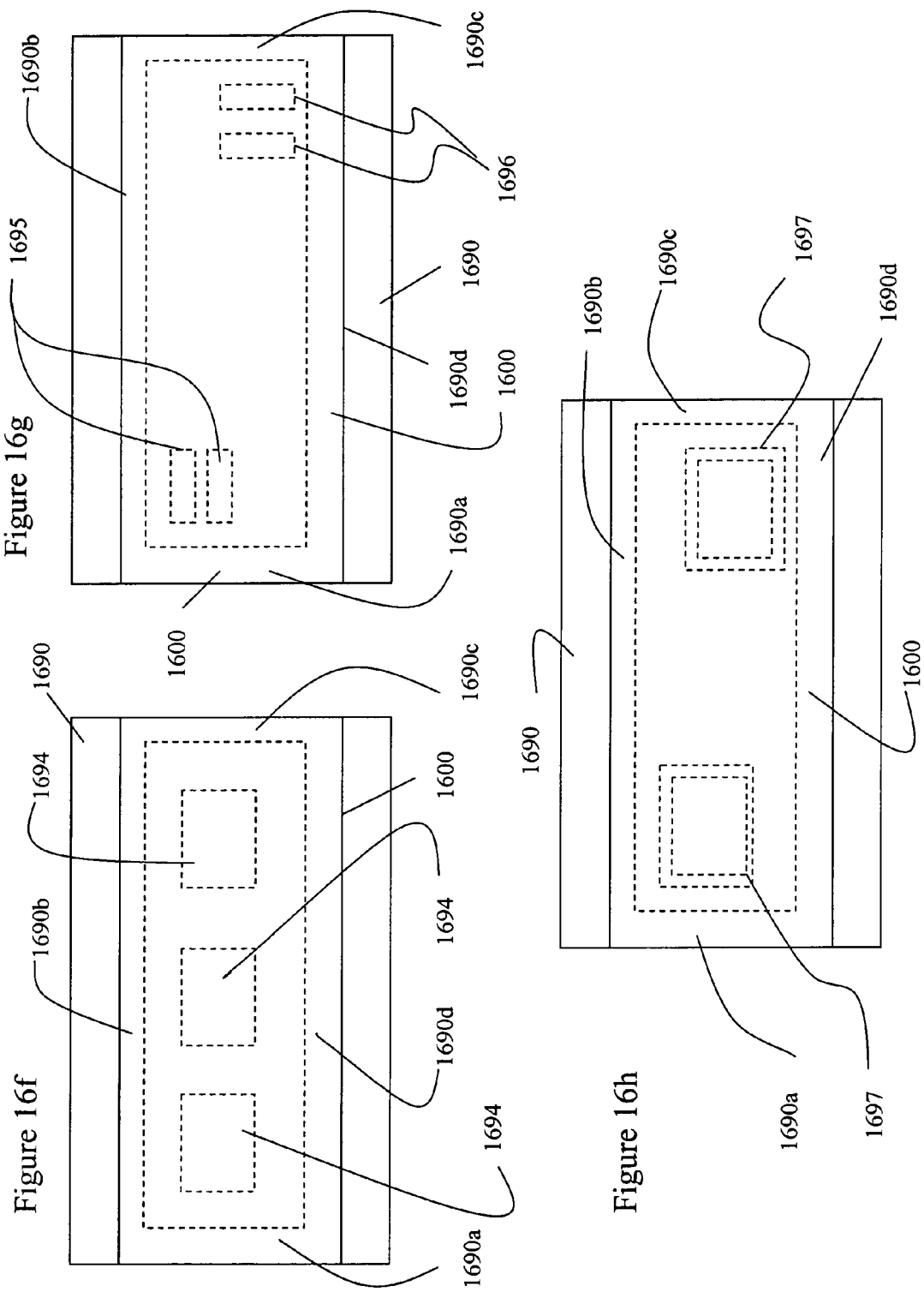

PACKAGING FOR PLANAR LIGHTWAVE CIRCUITS

CROSS-REFERENCE TO RELATED APPLICATIONS

The present application claims priority from U.S. patent application Ser. No. 60/536,708 filed Jan. 16, 2004, which is incorporated herein by reference.

TECHNICAL FIELD

The present invention relates to planar lightwave circuits (PLCs), and in particular to packaging, which induces stress in a PLCs for modifying performance characteristics, such as birefringence, center wavelength shift, insertion loss, and optical mode profile control.

BACKGROUND OF THE INVENTION

Planar lightwave circuits, including optoelectronic integrated circuits (OEICs), are currently used in optical telecommunication systems, inter alia, for allowing the branching, coupling, switching, wavelength multiplexing and wavelength demultiplexing of optical signals without intermediate transformation between optical and electrical media.

A planar lightwave circuit is typically fabricated by forming one or more waveguides on a planar substrate, such as a silicon wafer. More specifically, the waveguides are usually embedded within an optical layer that may consist of buffer layers, cladding layers, core layers and encapsulation layers formed on the planar substrate which is frequently formed from doped/undoped silica, $LiNbO_3$, InP, GaAs, and/or polymer (including thermo-optic and electro-optic polymers).

Typically, a large number of PLCs are fabricated on a single wafer, which is subsequently cut into multiple PLC dies. These chips are then packaged according to their particular applications to form the corresponding PLC device. For example, depending upon the required application, the PLC die may include integrated optical components, such as modulators, optical switches, and wavelength multiplexer/demultiplexers, that are mounted on a sub-mount. Typically, the sub-mount is secured in an enclosure that facilitates the attachment of optical fibers or waveguides to the packaged PLC device.

Notably, the optical performance of PLCs are typically very sensitive to the internal temperature within the package enclosure and the stress of the packaged product. The temperature sensitivity relates, in part, to the temperature dependent refractive indices of the optical layers used to fabricate the various components, and in part, due to the significant coefficients of expansion of the materials typically used to form the PLC device. The stress sensitivity relates to the stress-dependent refractive index variation of the optical layers. Ambient temperature changes often result in the expansion or contraction of the optical layer, the substrate, and/or the sub-mount. In general, this expansion will result in the length and/or width of the waveguides being altered, thus affecting performance and reliability of the device. The stress induced in the optical layer from these expansive/contractive forces induce changes in the refractive index, and as a result modify the PLC performance characteristics.

An arrayed waveguide grating (AWG) is one example of a PLC that exhibits high sensitivity to both temperature and stress. An AWG functions as either a multiplexer or a demultiplexer. When functioning as a demultiplexer, the AWG takes a multiplexed optical signal transmitted from an input waveguide and transmits it through an array of curved waveguides such that a plurality of demultiplexed optical signals are individually output from a series of output waveguides. The optical path difference (OPD) between adjacent waveguides in the array provides the necessary interference to demultiplex the optical signal. Accordingly, the refractive index and lengths and widths of the arrayed waveguides must be accurately maintained. Even small changes in temperature will result in the central wavelength of each demultiplexed optical signal being shifted. For example, in silica-based AWGs the shift in central wavelength, due to temperature alone, is in the order of +0.011 nm/° C., in InP-based AWGs the shift in central wavelength is in the order of +0.019 nm/° C., and in polymer-based AWGs the shift in central wavelength is in the order of −0.1 nm/° C.

Conventionally, the thermal stability problems of PLCs have been countered by including a precise active thermal regulator with the PLC packaging. The thermal regulator typically includes a thermometer, a Peltier device, and a control unit for heating and/or cooling the PLC to maintain a constant temperature thereof. Since the PLC is maintained at a constant temperature, the problems associated with temperature sensitivity are greatly reduced. Unfortunately, to achieve an acceptable performance level, the thermal regulator is typically relatively costly, energy consuming, and requires additional circuitry/hardware to monitor and maintain a stable temperature.

The use of passive techniques for thermal compensation to reduce temperature sensitivity is advantageous over active compensation because: a) passive techniques are more reliable and less expensive; b) passive techniques do not require power; c) the package does not require heat sinks and may be made smaller; and d) the packaging process is faster and easier, since the extra components do not need to be placed or bonded.

Alternatively, PLCs have been designed to reduce temperature sensitivity and obviate the need for a thermal regulator. For example, U.S. Pat. No. 6,519,380, Dawes et al. discloses an organic containing overclad (such as a polymer or sol-gel material) in the silica optical layer. The organic containing overclad, which only needs to cover part of the PLC, is selected to have a negative variation in refractive index with temperature to compensate the positive variation in refractive index of the rest of the optical layer (i.e., the light also travels through the overclad). The result is an inhibited shift in central wavelength with temperature. U.S. Pat. No. 6,574,409, issued to Moroni et al., teaches an optical layer with a compensating region therein. More specifically, a region of the silica optical layer, which has a positive variation of index of refraction with temperature, is etched out and replaced with a polymer having a negative variation of index of refraction. The two different varying indices of refraction compensate for one another to reduce temperature sensitivity.

The two above-mentioned references propose performance stability by compensating for the variation of refractive index with temperature. Alternatively, it is possible to impart temperature insensitivity by compensating for the variation in waveguide dimensions with temperature. For example, U.S. Pat. No. 6,477,308, issued to Hattori et al., discloses an optical layer that has a positive linear expansion coefficient and a second layer adjacent to the optical layer that has a negative linear expansion coefficient. As the optical layer expands with temperature, the second layer begins to contract, thus compensating for any variation in length of the waveguides. U.S. Pat. No. 6,542,685, issued to Yoneda, discloses a substrate with a zero or negative coefficient of thermal expansion to obtain a temperature insensitive optical waveguide. In addition, the Yoneda reference teaches providing a second substrate having a zero or negative coefficient of thermal expansion that is mounted to the optical layer, while the original substrate is removed.

Unfortunately, each of aforementioned solutions require a modification to the PLC prior to packaging, thereby increasing the manufacturing time and cost. Furthermore, the modifications requiring the substrate to have a low or negative coefficient of expansion will complicate the design and manufacture of the corresponding PLC, and will further increase the manufacturing cost.

U.S. Pat. No. 5,978,539, issued to Davies et al., which is incorporated herein by reference, teaches the elimination of thermal effects on the optical properties of an unmodified PLC. More specifically, they teach mounting a control layer to the bottom of the silicon substrate, wherein the control layer and substrate both have a positive, but different coefficient of thermal expansion. In response to an increase in ambient temperature, the control layer expands at a faster rate than the substrate to create a non-planar substrate distortion, thus creating a temperature independent optical path length. Unfortunately, non-planar thermal distortions are associated with being undesirable for various reasons. For example, in U.S. Pat. No. 6,603,916, hereby incorporated by reference, McGreer et al. focus on methods to reduce similar non-planar distortions.

Notably, each of the above-mentioned references are based on reducing temperature sensitivity of silica-based PLCs. It is also possible to use the temperature sensitivity of PLCs to tune the device operation of the same. Any optical substrate has a variation of the refractive index with temperature through the coefficient dn/dT: $\Delta n_T = dn/dT \cdot \Delta T$. If the variation in the refractive index with temperature is not sufficient or is too large for a specific application, the effect can be corrected by adding to the variation of the refractive index through stress, e.g. thermal or mechanical stress, $\Delta n_S$, in a controlled way through the package base design in such a way that the total variation $\Delta n_{Total} = \Delta n_T + \Delta n_S$ has the desired value. Through fine tuning the $\Delta n_{Total}$ can be decreased.

More recently, there as been an increased interest in polymer-based PLCs, which are associated with lower production costs. However, polymer-based PLCs typically exhibit a negative and much larger variation of refractive index with temperature than do silica-based PLCs. Accordingly, accounting for temperature sensitivity, such as when maintaining device performance and/or tuning device operation, is often very challenging. In particular, most of the techniques used to impart temperature insensitivity to silica-based PLCs are not compatible with polymer-based PLCs, because they are used to compensate for positive variations in refractive index as opposed to the negative variation of refractive index with temperature exhibited by most polymer-based PLCs.

An object of the present invention is to overcome the shortcomings of the prior art by providing a package for inducing stress in a PLC, either passively to compensate for temperature variations or actively using thermally or mechanically actuated systems.

SUMMARY OF THE INVENTION

Accordingly, the present invention relates to a planar lightwave circuit device comprising:
a planar lightwave circuit including:
an optical layer having a lightwave circuit substantially disposed in a plane, and
a substrate supporting the optical layer, the substrate having a first coefficient of thermal expansion; and
stress applying means for inducing one of a compressive and a tensile stress to the optical layer in the plane thereof for modifying a performance characteristic of the planar lightwave circuit.

BRIEF DESCRIPTION OF THE DRAWINGS

Further features and advantages of the present invention will become apparent from the following detailed description, taken in combination with the appended drawings, in which:

FIG. 2a is a cross sectional side view of a PLC device in accordance with an embodiment of the instant invention;

FIG. 2b is a plan view of the PLC device shown in FIG. 2a;

FIG. 3a is a cross sectional side view of a PLC device in accordance with another embodiment of the instant invention including a plate for support;

FIG. 3b is a plan view of the PLC device shown in FIG. 3a;

FIG. 3c is a plan view of an alternative embodiment of the base walls of FIG. 3a;

FIG. 3d is a plan view of an alternative embodiment of the base walls of FIG. 3a;

FIG. 3e is a plan view of an alternative embodiment of the base walls of FIG. 3a;

FIG. 3f is a plan view of an alternative embodiment of the base walls of FIG. 3a;

FIG. 4a is a cross sectional side view of a PLC device having a heater in accordance with another embodiment of the instant invention;

FIG. 4b is a plan view of the PLC device shown in FIG. 4a;

FIG. 5a is a cross sectional side view of a PLC device having a heating element in accordance with yet another embodiment of the instant invention;

FIG. 5b is a plan view of the PLC device shown in FIG. 5a;

FIG. 6a is a cross sectional side view of a PLC device in accordance with an embodiment of the instant invention, wherein there are two opposing support walls;

FIG. 6b is a plan view of the PLC device shown in FIG. 6a;

FIG. 7a is a cross sectional side view of a PLC device in accordance with another embodiment of the instant invention, wherein there are two opposing support walls;

FIG. 7b is a plan view of the PLC device shown in FIG. 7a;

FIG. 8a is a cross sectional side view of a PLC device in accordance with an embodiment of the instant invention, including an annular support wall;

FIG. 8b is a plan view of the PLC device shown in FIG. 8a;

FIG. 9a is a cross sectional side view of a PLC device in accordance with an embodiment of the instant invention, including a Peltier element;

FIG. 9b is a plan view of the PLC device shown in FIG. 9a;

FIG. 10b is a plan view of the PLC device shown in FIG. 10a;

FIG. 11b is a plan view of the PLC device shown in FIG. 11a;

FIG. 12a is a cross sectional side view of a PLC device in accordance with yet an embodiment of the instant invention, including an upper support structure;

FIG. 12b is a plan view of the PLC device shown in FIG. 12a;

FIGS. 15b to 15e are plan views of alternative embodiments of the partially unattached support structure of FIG. 15a;

FIG. 16b to 16h are plan view of alternative embodiments of the partially unattached support structure of FIG. 16a.

It will be noted that throughout the appended drawings, like features are identified by like reference numerals.

DETAILED DESCRIPTION OF THE PREFERRED EMBODIMENT

Figure 1:
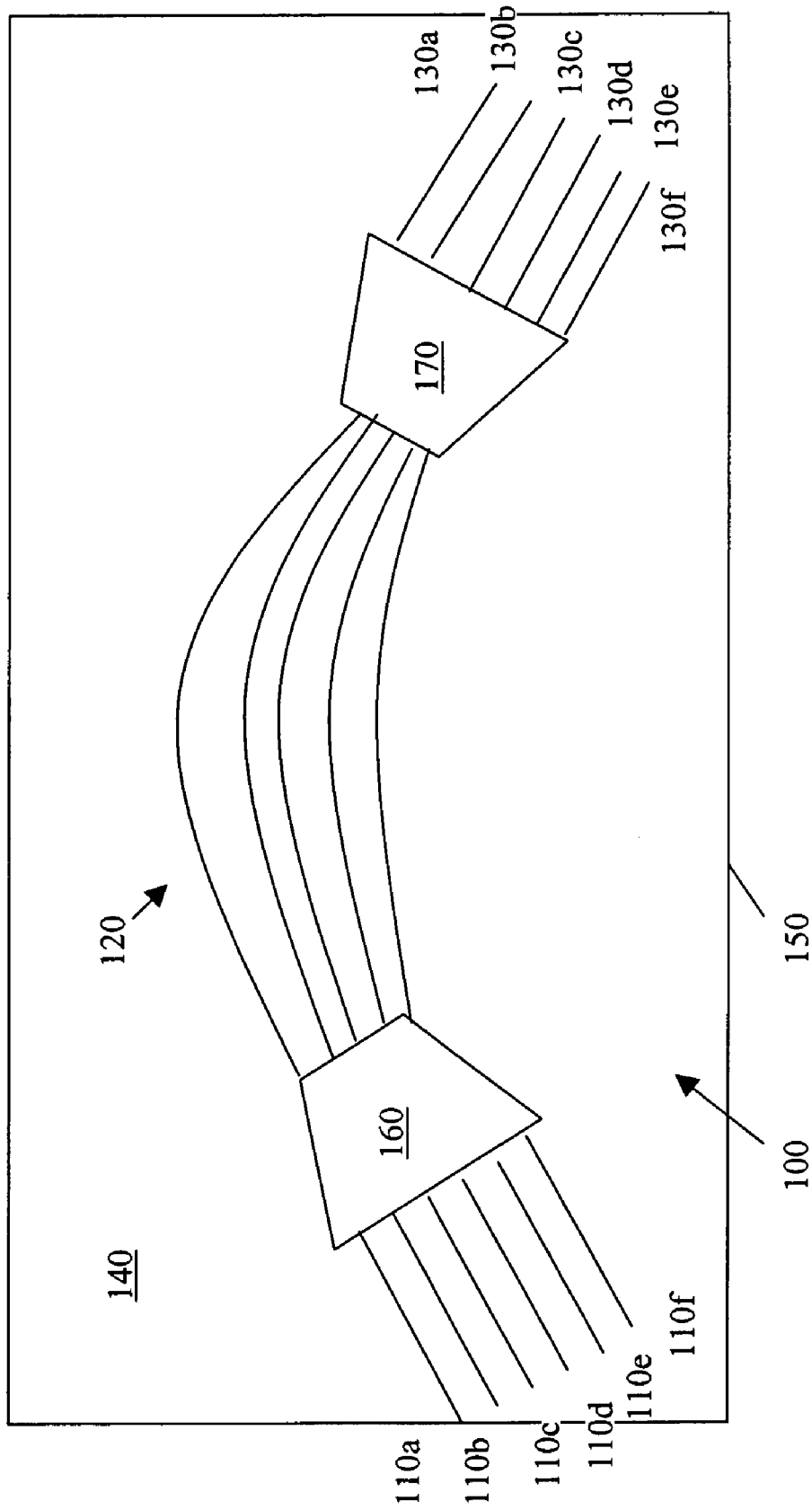
FIG. 1 is a schematic illustration of a prior art AWG.

With reference to FIG. 1, a conventional PLC is in the form of an arrayed waveguide grating (AWG) 100, which includes six input waveguides 110a, 110b, 110c, 110d, 110e and 110f, an array of curved waveguides 120, and six output waveguides 130a, 130b, 130c, 130d, 130e and 130f. Each waveguide is embedded within an optical layer 140, e.g. a polymer, formed on a substrate 150, e.g. silicon or plastic, using methods that are well known in the art. Preferably, the coefficient of thermal expansion (CTE) of the substrate 150 is matched with that of the optical layer 140. The input 110 and output 130 series of waveguides are coupled to the waveguide array 120, with input 160 and output 170 slab waveguides (e.g. star couplers), respectively.

In operation, a multiplexed light signal is transmitted from a single input waveguide, for example 110c, and is transmitted through each waveguide of the array of curved waveguides 120 such that individual demultiplexed signals are output from the series of output waveguides 130. For example, if the input optical signal includes wavelengths $\lambda_1$ to $\lambda_n$, then a first demultiplexed optical signal having a center wavelength $\lambda_1$ will be output waveguide 130a, a second demultiplexed optical signal having a center wavelength $\lambda_2$ will be output waveguide 130b, a third demultiplexed optical signal having a center wavelength 3 will be output waveguide 130c, a fourth demultiplexed optical signal having a center wavelength 4 will be output waveguide 130d, a fifth demultiplexed optical signal having a center wavelength 5 will be output waveguide 130e, and a sixth demultiplexed optical signal having a center wavelength $\lambda_6$ will be output waveguide 130f.

As discussed above, any variation in temperature will affect the AWG's performance, such that the central wavelengths of the demultiplexed signals shift from the desired and predetermined values (i.e. $\lambda_1, \lambda_2, \ldots \lambda_n$). The temperature sensitivity relates, in part, to the temperature dependent refractive index of the optical layer 140, and in part, due to the stress dependent refractive index of the optical layer 140. Notably, the temperature dependence of the refractive index is expected to play an important role in the overall temperature sensitivity of the AWG in FIG. 1, since most optical polymers are known to have relatively large thermo-optic coefficients. For example, as the ambient temperature increases, the optical layer 140 will experience a significant negative refractive index change that causes the center wavelengths to shift to a lower wavelength. The induced stress can also be used to modify performance characteristics, including birefringence, wavelength shift, insertion loss and optical mode profile control.

FIGS. 2a and 2b illustrate a packaging for a PLC, such as the one illustrated in FIG. 1, in accordance with an embodiment of the present invention. The packaged PLC 200 shown in FIG. 2a, includes an optical layer 240, e.g. polymer, formed on a substrate 250, e.g. acrylate, polycarbonate, polypropylene or silicon. Within the optical layer 240 are optical waveguides (not shown) that form the PLC. The substrate 250 is mounted above a base 290, e.g. allyl carbonate, high-density polyethylene, high-density polypropylene, low-density polypropylene, TIVAR 88 or aluminum. More specifically, the substrate 250 is attached with adhesive or any other suitable means (not shown) to the base 290 via four wall portions 290a, 290b, 290c, and 290d, which extend from the package base 290 to the ends of the substrate 250, e.g. to the outer edges of the lower surface of the substrate 250 or any positions on the undersurface of the substrate 250 creating a gap therebetween. The walls 290a, 290b, 290c, and 290d are contiguous with each other forming an air gap therebetween and with the base 290. Preferably, the walls 290a and 290c are parallel to each other and perpendicular to walls 290b and 290d; however, the walls 290a to 290d could form separate wall portions and have any desired orientation. Optionally, an enclosure (not shown) surrounds the PLC and the package base 290. The coefficient of thermal expansion of the silicon substrate 250 is approximately $3.6 \times 10^{-6}$ $C^{-1}$, approximately $50 \times 10^{-6}$ $C^{-1}$ for the acrylate substrate, $70 \times 10^{-6}$ $C^{-1}$ for the polycarbonate, and $80 \times 10^{-6}$ $C^{-1}$ for the polypropylene. The coefficient of thermal expansion for the aluminum package base 290 and walls 290a to 290d is $23.1 \times 10^{-6}$ $C^{-1}$, $210 \times 10^{-6}$ $C^{-1}$ for allyl carbonate, $225 \times 10^{-6}$ $C^{-1}$ for high-density polyethylene, and $216 \times 10^{-6}$ $C^{-1}$ for natural polypropylene.

In operation, increases in ambient temperature cause the base 290 to expand, and thus for the distance between the package walls 290a and 290c and between 290b and 290d to increase. Similarly, the substrate 250 is also subject to expansion. However, since the base 290 has a higher coefficient of expansion than the substrate 250 and the optical layer 240, the substrate 250 and hence the optical layer 240, will be subject to a tensile stress that forces them to expand more than they normally would. This stress induces a positive refractive index change in the optical layer 240 that at least partially compensates the negative refractive index change caused by the increased temperature.

In contrast, decreases in ambient temperature cause the base 290 to contract and for the distance between the walls 290a and 290c and between 290b and 290d to decrease. Similarly, the substrate 250 is also subject to contraction; however, since the base 290 contracts more than the substrate 250, the substrate 250 and hence the optical layer 240, will be subject to a compressive stress that forces them to contract even more. This stress induces a negative refractive index change in the optical layer 240 that at least partially compensates the positive refractive index change caused by the decreased temperature.

Notably, both the tensile and compressive stresses occur substantially all (or at least 80%) in the plane of the PLC, or in a plane parallel to the PLC (e.g. the plane of FIG. 2b). Since, the induced stresses provide compensation for changes in refractive index with temperature, there is a decrease in temperature sensitivity with respect to center wavelength shift. The degree of compensation is related to the thickness of the optical layer 240, the thickness of the substrate 250 and the base 290, the shape, height and thickness of the sustaining walls 290a to 290d, and the position and placement of the sustaining walls 290a to 290d. The degree of compensation is also dependent on the materials used to form the optical layer 240, the substrate 250, the base 290 and the sustaining walls 290a to 290d. For example, the coefficients of thermal expansion and the values of Young's modulus for the substrate 250 and the base 290 are particularly important.

Advantageously, the stress induced within the optical layers changes the refractive index thereof. The refractive index change modifies performance characteristics, such as birefringence, wavelength shift, insertion loss and optical mode profile control, of the optical layer. When the stress changes the refractive index and at least partially compensate for a change in refractive index caused by the change in temperature, the instant invention provides greatly reduced temperature sensitivity for PLC devices based on polymer-based, semiconductor and glass optical layers.

Figure 3D:
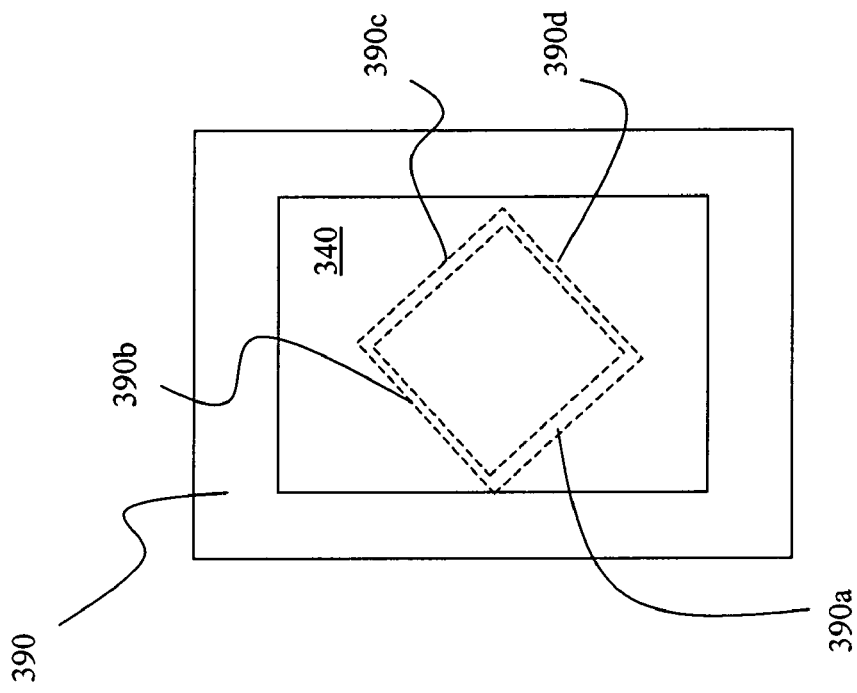
Figure 3C:
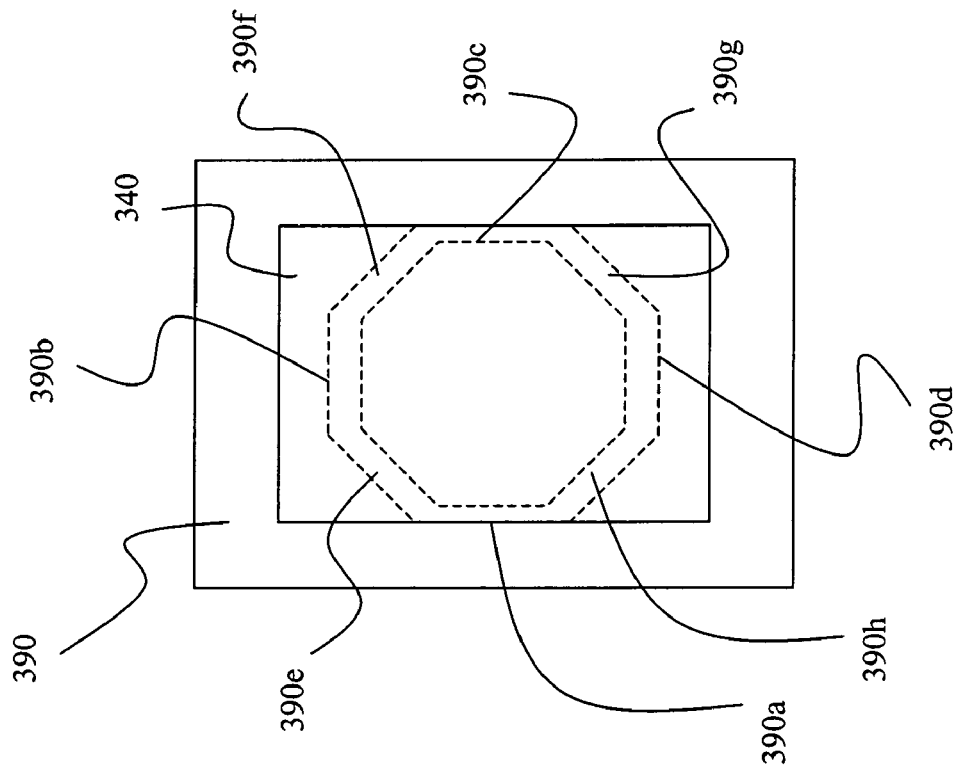

With reference to FIGS. 3a and 3b, a PLC 300 in accordance with another embodiment of the instant invention, includes an optical layer 340, e.g. polymer, formed on a substrate 350, e.g. acrylate, polycarbonate, polypropylene or silicon. Within the optical layer 340 are optical waveguides (not shown) that form the AWG. The substrate 350 is attached to a stiffening plate 380, e.g. polyurethane or same as substrate 350 above, which is mounted above a base 390, e.g. allyl carbonate, high-density polyethylene, high-density polypropylene, low-density polypropylene, TIVAR 88 or aluminum. More specifically, the stiffening plate 380 is attached with adhesive (not shown) to the base 390 via four wall portions 390a, 390b, 390c, and 390d, which extend from the package base 390 to the ends of the stiffening plate 380, e.g. to the outer edges of the lower surface of the stiffening plate 380 or any positions on the undersurface of the stiffening plate 380 creating a gap therebetween. The walls 390a to 390d are contiguous with the base 390 and with each other forming an air gap therebetween and with the stiffening plate 380. The walls 390a and 390c are parallel to each other and perpendicular to walls 390b and 390d; however, the walls 390a to 390d could form separate wall portions and have any desired shape, dimension and orientation depending on requirements (see FIGS. 3c to 3f). In FIG. 3c, additional walls 390e to 390h are added forming an octagonal wall. The wall portions 390a to 390d are positioned diagonally, e.g. 45°, relative to the edges of the substrate 350, i.e. the longitudinal axis of the PLC 300, in FIG. 3d. FIGS. 3e and 3f illustrate configurations including only two separate walls 390a and 390c positioned opposite each other, again, along an axis which is diagonal, e.g. 45°, to the walls of the substrate or the longitudinal axis of the PLC 300. The walls 390a and 390f in FIG. 3f are arcuate for applying a more localized stress. Optionally, an enclosure (not shown) surrounds the PLC and package base. The stiffening plate 380 minimizes the amount of non-planar deformation of the substrate 350 and the optical layer 340.

For exemplary purposes, the stiffening plate 380 is shown being approximately twice as thick as the PLC substrate 350; however, other thicknesses are also within the scope of the instant invention. The coefficient of thermal expansion of the silicon substrate 350 is approximately $3.6 \times 10^{-6}$ $C^{-1}$, approximately $50 \times 10^{-6}$ $C^{-1}$ for the acrylate substrate, $70 \times 10^{-6}$ $C^{-1}$ for the polycarbonate, and $80 \times 10^{-6}$ $C^{-1}$ for the polypropylene. The coefficient of thermal expansion for the aluminum package base 290 and walls 390a to 390d is $23.1 \times 10^{-6}$ $K^{-1}$, $210 \times 10^{-6}$ $C^{-1}$ for allyl carbonate, $225 \times 10^{-6}$ $C^{-1}$ for high-density polyethylene, and $216 \times 10^{-6}$ $C^{-1}$ for natural polypropylene.

In operation, increases in ambient temperature cause the base 390 to expand, and thus for the distance between the walls 390a and 390c and between 390b and 390d to increase. Similarly, the substrate 350 and the stiffening plate 380 are also subject to expansion. However, since the base 390 has a higher coefficient of expansion than the substrate 350, the optical layer 340 and the stiffening plate 380, the substrate 350, and hence the optical layer 340, will be subject to a tensile stress substantially in the plane thereof or parallel thereto that forces them to expand more. This stress induces a positive. refractive index change in the optical layer 340 that at least partially compensates the negative refractive index change caused by the increased temperature.

In contrast, decreases in ambient temperature cause the base 390 to contract and for the distance between the walls 390a and 390c and between 390b and 390d to decrease. Similarly, the substrate 350 is also subject to contraction; however, since the base 390 contracts more than the stiffening plate 380, the substrate 350 and hence the optical layer 340, will be subject to a compressive stress that forces them to contract even more. This stress induces a negative refractive index change in the optical layer 340 that at least partially compensates the positive refractive index change caused by the decreased temperature.

Notably, both the tensile and compressive stresses occur mainly in the plane of the PLC, or in a plane parallel to the PLC. Since, the induced stresses provide compensation for changes in refractive index with temperature, there is a decrease in temperature sensitivity with respect to center wavelength shift. The degree of compensation is related to the thicknesses of the optical layer 340, the substrate 350, the base 390 and the stiffening plate 380, the shape, height and thickness of the sustaining walls 390a to 390d, and the position and placement of the sustaining walls 390a to 390d. The degree of compensation is also dependent on the materials used to form the optical layer 340, the substrate 350, the stiffening plate 380, the base 390 and the sustaining walls 390a to 390d. For example, the coefficients of thermal expansion and the values of Young's modulus for the substrate 350, the stiffening plate 380, and the base 390 are particularly important.

Advantageously, the stiffening plate 380 provides additional support to the PLC. For example, when the PLC is subject to the temperature induced stresses discussed above, the stiffening plate helps to stiffen the substrate 350, maintaining the tensile and compressive stresses within or parallel to the plane of the PLC, and further discouraging non-planar deformations. Optionally, the stiffening plate 380 is fabricated with another material selected to have a coefficient of thermal expansion close to that of the substrate 350.

Referring to FIGS. 4a and 4b, a packaged PLC 400 in accordance with another embodiment of the present invention, includes an optical layer 440, e.g. polymer, formed on a substrate 450, e.g. acrylate, polycarbonate, polypropylene or silicon. Within the optical layer 440 are optical waveguides (not shown) that form a PLC, e.g. an AWG. The substrate 450 is attached to a stiffening plate 480, e.g. Silvar with a CTE of $6.5 \times 10^{-6}$ K$^{-1}$, polyurethane or same as substrate 450 above, with adhesive (not shown). The stiffening plate 480 is mounted above a base 490. More specifically, the stiffening plate 480 is attached with adhesive (not shown) to the base 490 via four wall portions 490a, 490b, 490c, and 490d, which extend from the package base 490 to the ends of the stiffening plate 480, e.g. to the outer edges of the lower surface of the stiffening plate 480 or any positions on the undersurface of the stiffening plate 480 creating a gap therebetween. The walls 490a to 490d are contiguous with the base 490 and with each other forming an air gap therebetween and with the stiffening plate 480. Preferably, the walls 490a and 490c are parallel to each other and perpendicular to walls 490b and 490d; however, the walls 490a to 490d could form separate wall portions and have any desired shape, dimension and orientation depending upon the requirements. An enclosure (not shown) is coupled to the base 490. A heater, e.g. a resistance heater, 495 is shown mounted on the base 490, in the air gap below the stiffening plate 480, to control the ambient temperature of the substrate 450 within the enclosure (not shown). Alternatively, the heater 495 is mounted elsewhere, e.g. within or outside the optional enclosure (not shown).

In operation, the heater 495 is actuated to maintain a relatively constant temperature of the substrate 450, e.g. within the enclosure. When small increases in temperature do occur, the base 490 is forced to expand and the distance between the a walls 490a and 490c and between 490b and 490d increases. Similarly, the substrate 450 and stiffening plate 480 are also subject to expansion; however, since the base 490 has a higher coefficient of expansion than the stiffening plate 480, the optical layer 440 and the substrate 450, the stiffening plate 480, and hence the substrate 450 and optical layer 440, will be subject to tensile stress that force them to expand more. This stress induces a positive refractive index change in the optical layer 440 that at least partially compensates the negative refractive index change caused by the increased temperature.

Notably, the induced stress occurs in the plane of the PLC, e.g. 90% to 100%, or in a plane parallel to the PLC. Since the induced stress provides compensation for changes in refractive index with temperature, there is a decrease in temperature sensitivity with respect to center wavelength shift. The degree of compensation is related to the thicknesses of the optical layer 440, the substrate 450, the stiffening plate 480 and the base 490, the shape, height and thickness of the sustaining walls 490a to 490d, and the position and placement of the sustaining walls 490a to 490d. The degree of compensation is also dependent on the materials used to form the optical layer 440, the substrate 450, the stiffening plate 480, the base 490 and the sustaining walls 490a to 490d. For example, the coefficients of thermal expansion and the values of Young's modulus for the substrate 450, the stiffening plate 480, and base 490 are particularly important.

The stiffening plate 480 provides additional support to the PLC and has a high thermal conductivity. The high thermal conductivity of the stiffening plate 480 permits the heat supplied by the heater 495 to be transferred in an approximately uniform manner across the substrate 450. Optionally, the stiffening plate 480 is replaced with another plate that provides sufficient stiffening and heat dissipation properties. For example, an AlSiC plate having an appropriate thickness is also within the scope of the instant invention. Preferably, the coefficient of thermal expansion of the stiffening plate 480 will be the same as or close to the coefficient of thermal expansion of the substrate 450. For example, a stiffening plate 480 with a coefficient of thermal expansion that is about two to three time greater than the coefficient of thermal expansion of the substrate 450 will generally suffice.

Advantageously, since the heater 495 maintains the temperature of the substrate 450 and hence the optical layer 440 relatively constant, the degree of compensation is sufficient to reduce temperature sensitivity and to maintain performance efficiency of the AWG. In fact, the temperature sensitivity of the PLC device in accordance with the instant embodiment is expected to be close to similar PLC devices, wherein the temperature is regulated with a more precise, more expensive, and more energy consuming heating element.

Figure 5C:
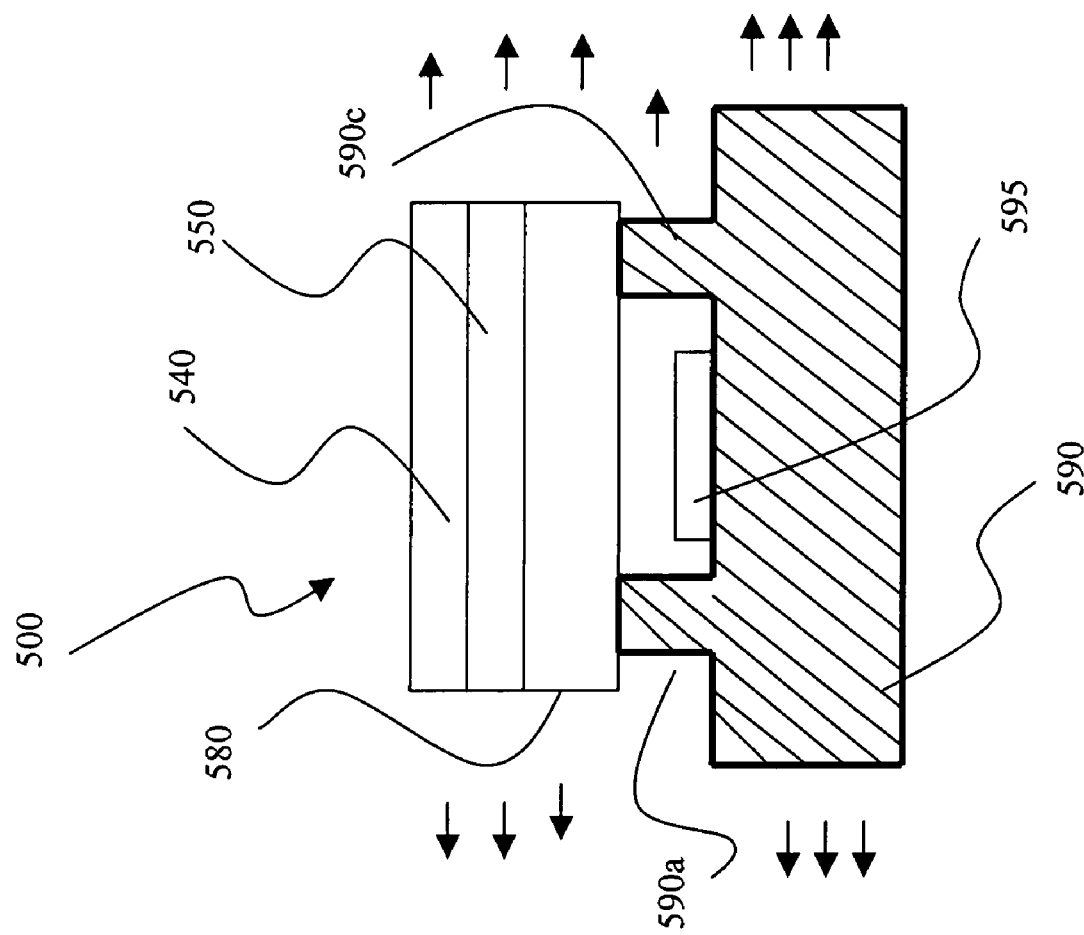
FIG. 5c is a schematic diagram of the PLC device shown in FIG. 5a, wherein the heating element is active.

FIGS. 5a and 5b illustrate a packaged PLC 500, in accordance with another embodiment of the present invention, which includes an optical layer 540 (as above) formed on a substrate 550 (e.g. as above). Within the optical layer 540 are optical waveguides (not shown) that form a PLC, e.g. an AWG. The substrate 550 is attached to a stiffening plate 580 (e.g. as above) with adhesive (not shown). The stiffening plate 580 is mounted above a base 590 (e.g. as above). More specifically, the stiffening plate 580 is attached with adhesive (not shown) to the base 590 via four wall portions 590a, 590b, 590c, and 590d, which extend from the package base 590 to the ends of the stiffening plate 580, e.g. to the outer edges of the lower surface of the stiffening plate 580 or any positions on the undersurface of the stiffening plate 580 creating a gap therebetween. The walls 590a to 590d are contiguous with the base 590 and with each other forming an air gap therebetween and with the stiffening plate 580. Preferably, the walls 590a and 590c are parallel to each other and perpendicular to walls 590b and 590d; however, the walls 590a to 590d could form separate wall portions and have any desired shape, dimension and orientation depending on optical requirements. For exemplary purposes the walls 590a, 590b, 590c, and 590d are shown attached to the periphery of the stiffening plate 580; however, other designs are also possible. An enclosure (not shown) is coupled to the base 590. A heating element 595, e.g. a Peltier heater, is mounted on the base 590, below the stiffening plate 580, to control the ambient temperature of the substrate 540 and optical layer 550, e.g. within the optional enclosure (not shown).

In operation, the heating element 595 is actuated to change the temperature within the enclosure (not shown). When increases in temperature occur, the base 590 expands and the distance between the walls 590a and 590c and between 590b and 590d increases. Similarly, the substrate 550 and the stiffening plate 580 are also subject to expansion; however, since the base 590 has a higher coefficient of thermal expansion than the stiffening plate 580, the optical layer 540 and the substrate 550, the stiffening plate 580 and hence the substrate 550 and the optical layer 540, will be subject to tensile stress that force them to expand more than they normally would (See FIG. 5c). This stress induces a positive refractive index change in the optical layer 540 that partially compensates the negative refractive index change caused by the increased temperature.

Preferably, the packaged PLC is designed such that the induced refractive index change in the optical layer 540 does not fully compensate for the negative refractive index change caused by the increased temperature. In other words, the PLC device is preferably designed to induce more or less stress than is needed to fully compensate for the refractive index change with temperature. The design features that are related to the degree of compensation are, for example, the thicknesses of the optical layer 540, the substrate 550, the stiffening plate 580 and the base 590, the shape, height and thickness of the sustaining walls 590a to 590d, the position and placement of the sustaining walls 590a to 590d, and the materials used to form the same. With respect to the latter, the coefficients of thermal expansion and the values of Young's modulus for the substrate 550, stiffening plate 580, and base 590 are particularly important.

Preferably, the degree of compensation is sufficient to produce a decrease in temperature sensitivity with respect to center wavelength shift of the PLC device, such that the center wavelength shifts with temperature allow efficient tuning of the PLC device. For example, reducing the center wavelength shift with temperature of a polymer based PLC provides fine tuning that is otherwise not achievable.

Advantageously, the stiffening plate 580 provides additional support to the PLC and has a high thermal conductivity so as transfer the heat supplied by the heating element 595 is an approximately uniform manner across the substrate 550. For example, when the PLC is subject to the temperature induced stresses discussed above, the stiffening plate 580 helps to stiffen the substrate 550, maintaining the induced stresses within or parallel to the plane of the PLC, and further discouraging non-planar deformations. Optionally, the stiffening plate 580 is replaced with another plate fabricated with another material that provides sufficient stiffening and heat transferring properties. For example, an AlSiC plate having an appropriate thickness is also within the scope of the instant invention.

With reference to FIGS. 6a and 6b, a packaged PLC 600, in accordance with another embodiment of the instant invention, includes an optical layer 640 (e.g. as above) formed on a substrate 650 (e.g. as above). Within the optical layer 640 are embedded optical waveguides (not shown) that form an AWG. The substrate 650 is attached to a stiffening plate 680 (e.g. as above) with adhesive (not shown). The stiffening plate 680 is mounted above a base 690 (e.g. as above). More specifically, the stiffening plate 680 is attached with adhesive (not shown) to the base 690 via two wall portions 690a and 690c, which extend from the package base 690 to opposite ends of the stiffening plate 680, e.g. to the outer edges of the lower surface of the stiffening plate 580 or any positions on the undersurface of the stiffening plate 680 creating a gap therebetween. The walls 690a and 690c are contiguous with the base 690, but separate from each other forming an air gap therebetween and with the stiffening plate 680. Preferably, the walls 690a and 690c are parallel to each other; however, the walls 690a and 690c could have any desired shape, dimension or orientation depending on optical requirements. For exemplary purposes the walls 690a and 690c are shown attached to the periphery of the stiffening plate 680; however, other designs are also possible. A heater 695, e.g. a resistance heater, is shown mounted to the base 690, below the stiffening plate 680, to control the ambient temperature of the substrate 650 and the optical layer 640, e.g. within the enclosure (not shown).

In operation, the heater 695 is actuated to control the temperature within the enclosure. When small increases in temperature occur, the base 690 expands and the distance between the walls 690a and 690c increases. Similarly, the substrate 650 and the stiffening plate 680 are also subject to expansion; however, since the base 690 has a higher coefficient of thermal expansion than the stiffening plate 680, the optical layer 640 and the substrate 650, the stiffening plate 680, and hence the substrate 650 and optical layer 640, will be subject to tensile stress that force them to expand more than they normally would. This stress induces a positive refractive index change in the optical layer 640 that at least partially compensates the negative refractive index change caused by the increased temperature.

FIGS. 7a and 7b illustrate another embodiment in accordance with the present invention, in which a packaged PLC 700 includes an optical layer 740 (e.g. as above) formed on a substrate 750 (e.g. as above). Within the optical layer 740 are optical waveguides (not shown) that form a PLC, e.g. an AWG. The substrate 750 is attached to a stiffening plate 780 with adhesive (not shown). The stiffening plate 780 is mounted above a base 790 (e.g. as above). More specifically, the stiffening plate 780 is attached with adhesive (not shown) to the base 790 via wall portions 790b and 790d, which extend from the package base 790 to opposite ends of an upper base 791, e.g. to the outer edges of the lower surface of the upper base 791. The walls 790b and 790d are contiguous with the base 790, the upper base 791 and with each other forming an air gap therebetween. Preferably, the walls 790b and 790d are parallel to each other; however, the walls 790b and 790d could have any desired shape, dimension or orientation depending on optical requirements. For exemplary purposes the walls 790b and 790d are shown attached to the periphery of the upper base 791; however, other designs are also possible. A heater 795 is shown mounted to the base 790, in the air gap below the stiffening plate 780, to control the ambient temperature of the substrate 750 and the optical layer 740, e.g. within the enclosure (not shown).

In operation, the heater 795 is actuated to control the within the enclosure. When small increases in temperature occur, the base 790 expands and the distance between the walls 790b and 790d increases. Similarly, the substrate 750 and the stiffening plate 780 are also subject to expansion; however, since the base 790 has a higher coefficient of expansion than the optical layer 740, the stiffening plate 780 and the substrate 750, the stiffening plate 780, and hence the substrate 750 and the optical layer 740, will be subject to tensile stress that force them to expand more than they normally would. This stress induces a positive refractive index change in the optical layer 740 that at least partially compensates the negative refractive index change caused by the increased temperature.

Referring to FIGS. 8a and 8b, a packaged PLC 800, in accordance with another embodiment of the instant invention, includes an optical layer 840 (e.g. as above) formed on a substrate 850 (e.g. as above). Within the optical layer 840 are optical waveguides (not shown) that form a PLC, e.g. an AWG. The substrate 850 is attached to a stiffening plate 880 with adhesive (not shown). The stiffening plate 880 is mounted above a base 890 (e.g. as above). More specifically, the stiffening plate 880 is attached with adhesive (not shown) to an annular wall 891, e.g. a ring or separate arcuate wall portions, which extends from the package base 890 to proximate the ends of the stiffening plate 880, e.g. to the outer edges of the lower surface of the stiffening plate 880 or any positions on the undersurface of the stiffening plate 880 creating a gap therebetween. The annular wall 891 can be separate or contiguous with the base 890 and form an air gap with the stiffening plate 880. A heater 895 is mounted on the base 890, within the annular wall 891 below the stiffening plate 880, to control the ambient temperature of the substrate 850 and the optical layer 840, e.g. within the enclosure (not shown).

Figure 8D:
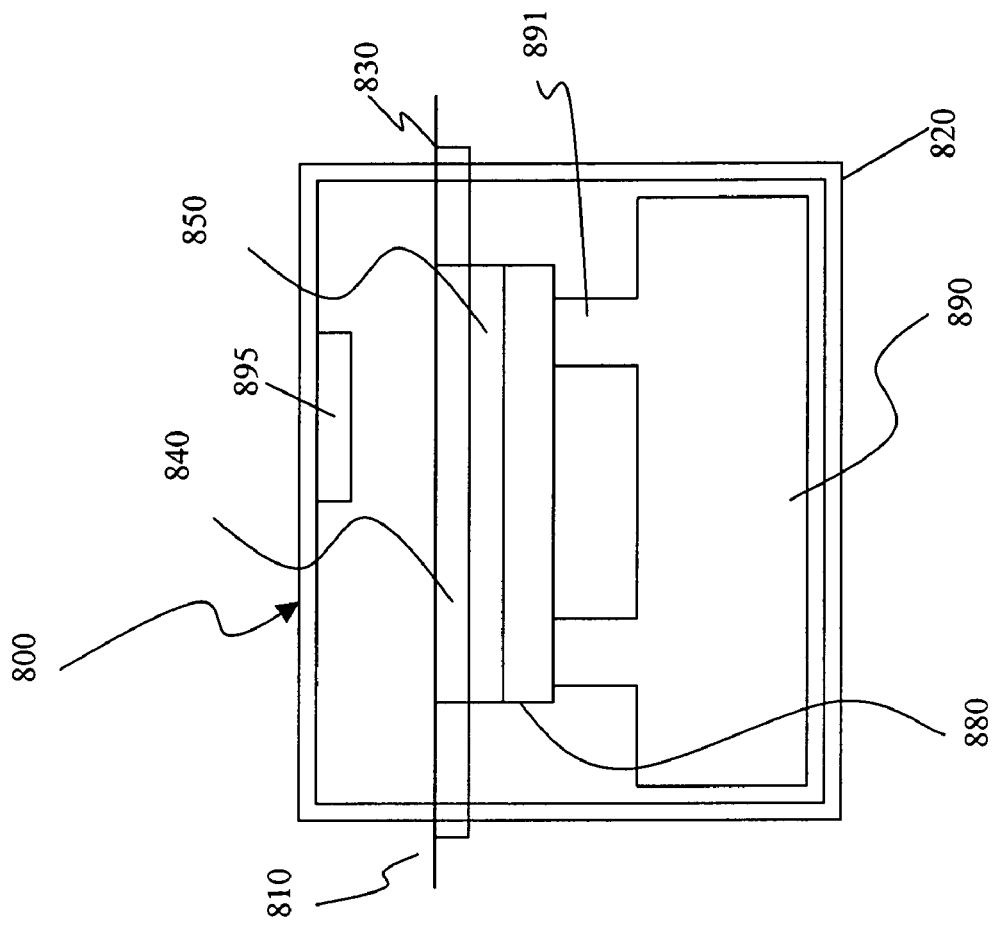
FIG. 8d is a schematic diagram of an enclosure in accordance with an embodiment of the instant invention.

With reference to FIG. 8*d*, an enclosure 820, in accordance with one embodiment the present invention, includes input and output optical connectors 810 and 830, respectively, to facilitate the attachment of optical fibers or waveguides to the PLC device 800. In this embodiment, the heat source 895 is attached to the top of the enclosure 820. According to another embodiment, the heat source 895 is attached to a different region of the interior of the enclosure or to the exterior of the enclosure 820.

Figure 8C:
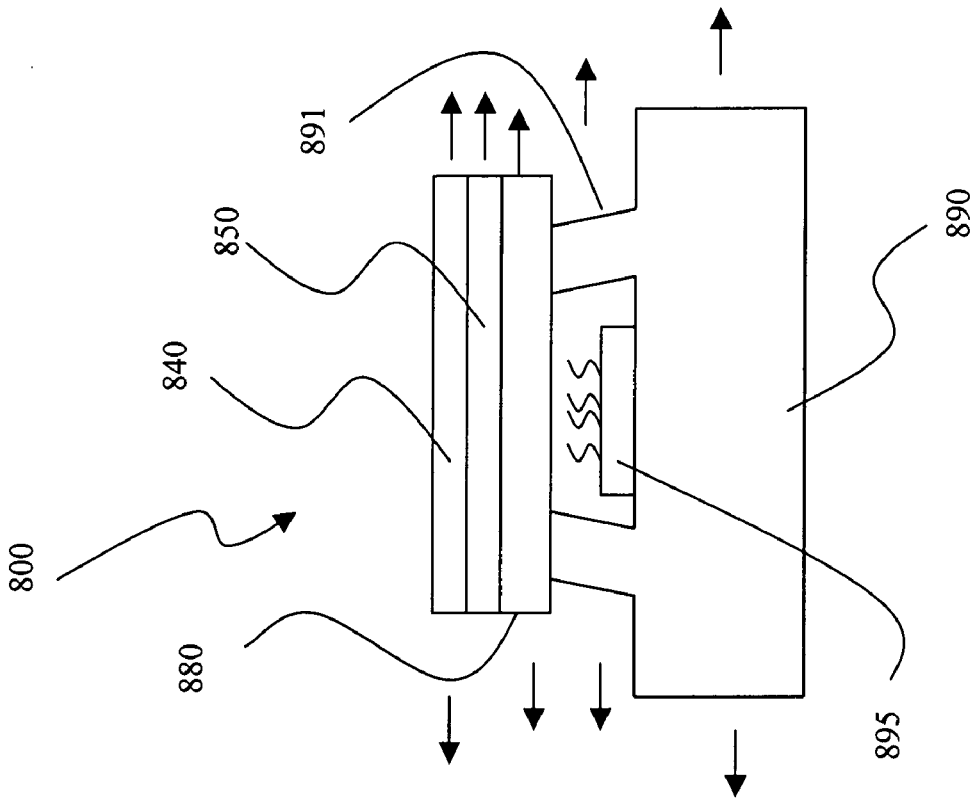
FIG. 8c is a schematic diagram of the PLC device shown in FIG. 8a, wherein the heater is active.

FIG. 8*c* illustrates the packaged PLC 800 when the heater 895 is actuated. As small increases in temperature occur, the base 890 and the wall 891 expand, such that the distance between opposite ends of the wall 891 increases, i.e. the ring increases in diameter. Similarly, the substrate 850 and the stiffening plate 880 are also subject to expansion; however, since the sustaining base 890 and wall 891 have a higher coefficient of expansion than the stiffening plate 880 and the substrate 850, the stiffening plate 880, and hence the substrate 850 and optical layer 840, will be subject to tensile stress that forces them to expand more than they normally would. This stress induces a positive refractive index change in the optical layer 840 that at least partially compensates the negative refractive index change caused by the increased temperature.

According to the above embodiment of the present invention, the sustaining wall 891 and the base 890 are both fabricated from the same material (e.g. as above) however, it is also within the scope of the instant invention for the sustaining wall 891 and base 890 to be fabricated from different materials. For example, according to one embodiment, the wall 891 is fabricated from allyl carbonate, while the base 890 is fabricated from a material having a relatively low coefficient of thermal expansion. According to another embodiment, the base 890 is fabricated from allyl carbonate, while the wall 891 is fabricated from a material having a relatively low coefficient of thermal expansion. In either embodiment a material having a relatively high coefficient of thermal expansion is optionally used to replace the allyl carbonate.

FIGS. 9*a* and 9*b*, illustrate a packaged PLC 900, in accordance with another embodiment of the present invention, which includes an optical layer 940, e.g. polymer, deposited on a substrate 950. Within the optical layer 940 are optical waveguides (not shown) that form a PLC, e.g. an AWG. The substrate 950 is attached to a stiffening plate 980 with adhesive (not shown). The stiffening plate 980 is mounted above an base 990. More specifically, the stiffening plate is attached with adhesive (not shown) to the base 990 via four walls 990*a*, 990*b*, 990*c*, and 990*d*, which extend from the package base 990 to the ends of the stiffening plate 980, e.g. to the outer edges of the lower surface of the stiffening plate 980 or any positions on the undersurface of the stiffening plate 980 creating a gap therebetween. The walls 990*a* to 990*d* are contiguous with the base 990 and with each other forming an air gap therebetween and with the stiffening plate 980. Preferably, the walls 990*a* and 990*c* are parallel to each other and perpendicular to walls 990*b* and 990*d*; however, the walls 990*a* to 990*d* could form separate wall portions and have any desired orientation depending on optical requirements. For exemplary purposes the walls 990*a* to 990*d* are shown attached to the periphery of the stiffening plate 980; however, other designs are also possible. An enclosure (not shown) is coupled to the base 990. A Peltier element 995 is mounted to the base 990, below the stiffening plate 980, with its hot side down.

In operation, the Peltier element 995 is actuated to control the temperature within the enclosure (not shown). As the Peltier element cools the stiffening plate 980, the stiffening plate 980, the substrate 950, and the optical layer 940 contract. At the same time, the Peltier element heats the base 990 such that the distance between the walls 990*a* and 990*c* and between the walls 990*b* and 990*d* increases. As a result, the stiffening plate 980, and hence the substrate 950 and the optical layer 940, will be subject to a tensile stress that causes them to expand (or at least not compress as much). This tensile stress induces a positive refractive index change in the optical layer 940 in addition to the positive refractive index change caused by the decreased temperature.

Figure 10B:
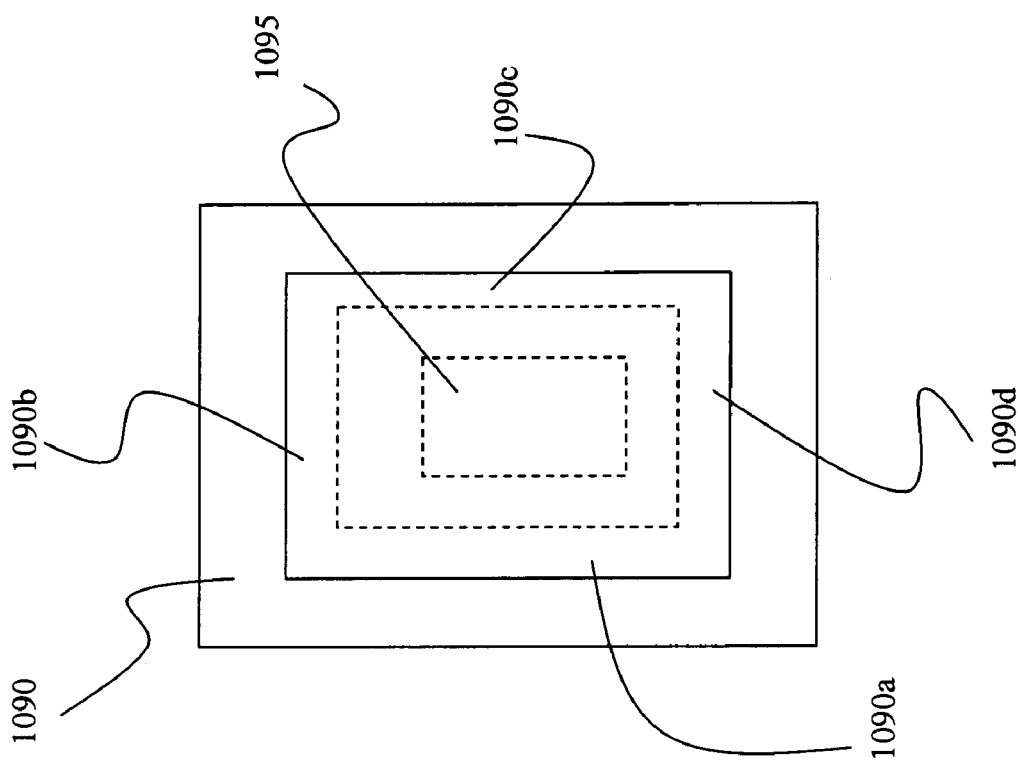
Figure 10A:
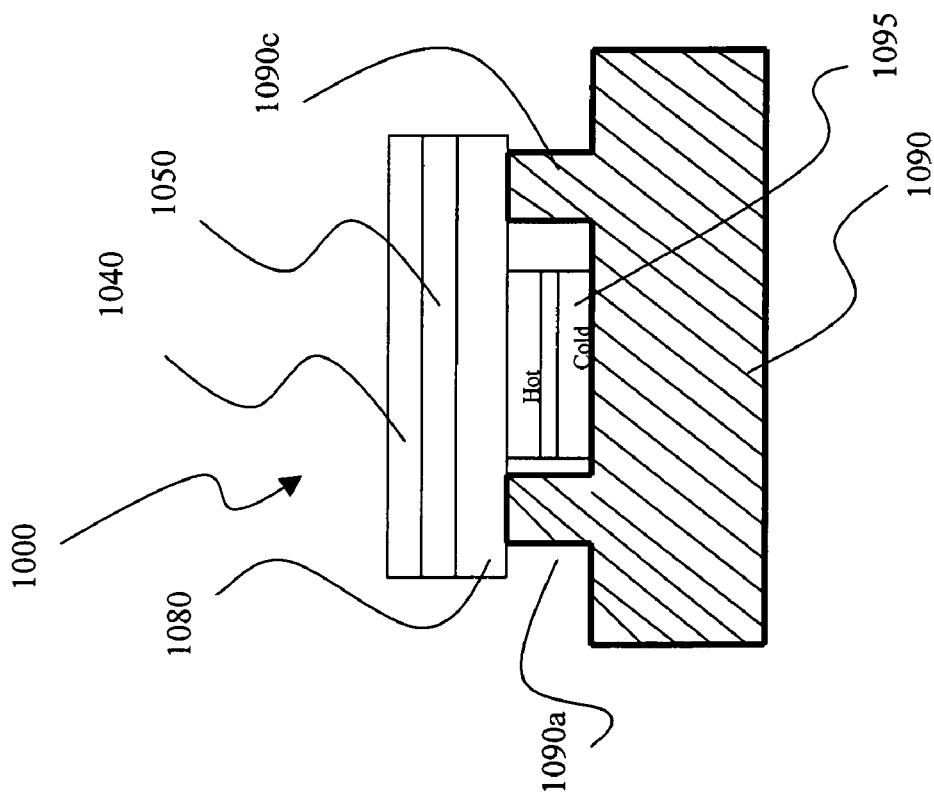
FIG. 10a is a cross sectional side view of a PLC device in accordance with yet an embodiment of the instant invention, including a Peltier element.

FIGS. 10*a* and 10*b* illustrate a packaged PLC 1000, in accordance with yet another embodiment of the present invention, which includes an optical layer 1040, e.g. polymer, deposited on a substrate 1050. Within the optical layer 1040 are optical waveguides (not shown) that form an AWG. The substrate 1050 is attached to a stiffening plate 1080 with adhesive (not shown). The stiffening plate 1080 is mounted above a base 1090. More specifically, the stiffening plate is attached with adhesive (not shown) to the base 1090 via four wall portions 1090*a*, 1090*b*, 1090*c*, and 1090*d*, which extend from the package base 1090 to the ends of the stiffening plate 1080, e.g. to the outer edges of the lower surface of the stiffening plate 1080 or any positions on the undersurface of the stiffening plate 1080 creating a gap therebetween. The walls 1090*a* to 1090*d* are contiguous with the base 1090 and with each other forming an air gap therebetween and with the stiffening plate 1080. Preferably, the walls 1090*a* and 1090*c* are parallel to each other and perpendicular to walls 1090*b* and 1090*d*; however, the walls 1090*a* to 1090*d* could form separate wall portions and have any desired shape, dimension or orientation depending on optical requirements. For exemplary purposes the walls 1090*a* to 1090*d* are shown attached to the periphery of the stiffening plate 1080; however, other designs are also possible. An enclosure (not shown) is coupled to the base 1090. A Peltier element 1095 mounted to the base 1090, below the stiffening plate 1080, with its cold side down.

In operation, the Peltier element 1095 is actuated to control the temperature within the enclosure (not shown). As the Peltier element 1095 heats the stiffening plate 1080, the substrate 1050, and the optical layer 1040, expand. However, since the base 1090 is in contact with the heat sink of the Peltier element 1095, the temperature of the base 1090, and hence the distance between the walls 1090*a* and 1090*c* and between the walls 1090*b* and 1090*d* does not change significantly. As a result, the stiffening plate 1080, and hence the substrate 1050 and optical layer 1040, will be subject to a compressive stress that causes them to not expand as much. This compressive stress induces a negative refractive index change in the optical layer 1040 in addition to the negative refractive index change caused by the increased temperature. Notably, this embodiment will provide temperature compensation for optical layers having a positive variation of refractive index with temperature, such as silica-based optical layers.

Notably, in each of the above described embodiments, the PLC device 1000 includes one or more support walls 1090*a* to 1090*d* that suspends the PLC above a portion of the base 1090. Of course, other designs for support walls are also within the scope of the instant invention. Preferably, the support wall(s) 1090*a* to 1090*d* will have a width and height that encourages the induced tensile or compressive stresses to occur mainly within a plane parallel to the substrate 1050, and that reduces non-planar deformations thereof. For example, tall, thin walls are generally pliable enough to slant (see FIG. 8*c*) such that the substrate 1050 remains planar during ambient temperature increases. Ideally, at least 80%, preferably at least 90% and most preferably substantially all of the induced stresses will occur within the plane parallel to the substrate 1050. Preferably, the width and thickness of the support wall(s) 1090*a* to 1090*d* are also selected to determine, at least in part, the degree of thermal insensitivity of the PLC device. For example, according to one embodiment the thickness of the optical layer 1040 and the substrate 1050, are 0.015 mm, and 0.5 mm respectively, whereas the sustaining walls are approximately 1.7 mm high and approximately 2.5 mm thick.

In addition, in each of the above-described embodiments, the support walls 1090*a* to 1090*d* are shown extending into contact with the bottom of the PLC, i.e. at opposite ends of the substrate 1050 or stiffening plate 1080. It is also possible for the PLC to be inverted such that the support walls 1090*a* to 1090*d* extend into contact with the top of the PLC. In this embodiment, a protection layer is optionally formed on top of the optical layer.

Figure 11B:
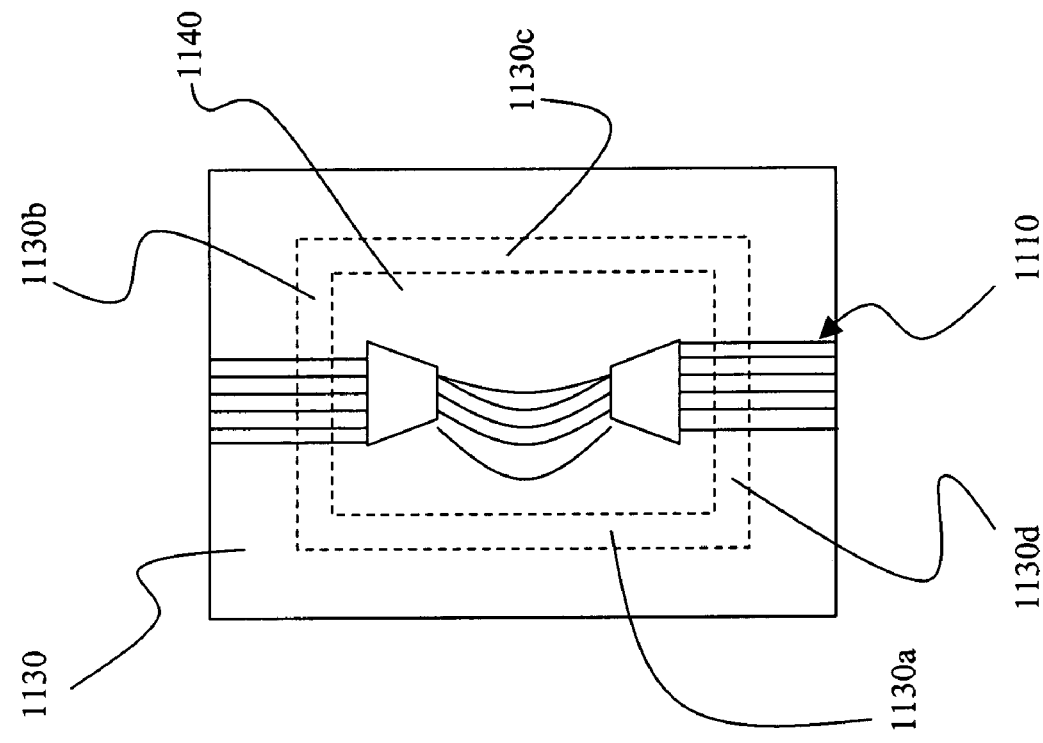
Figure 11A:
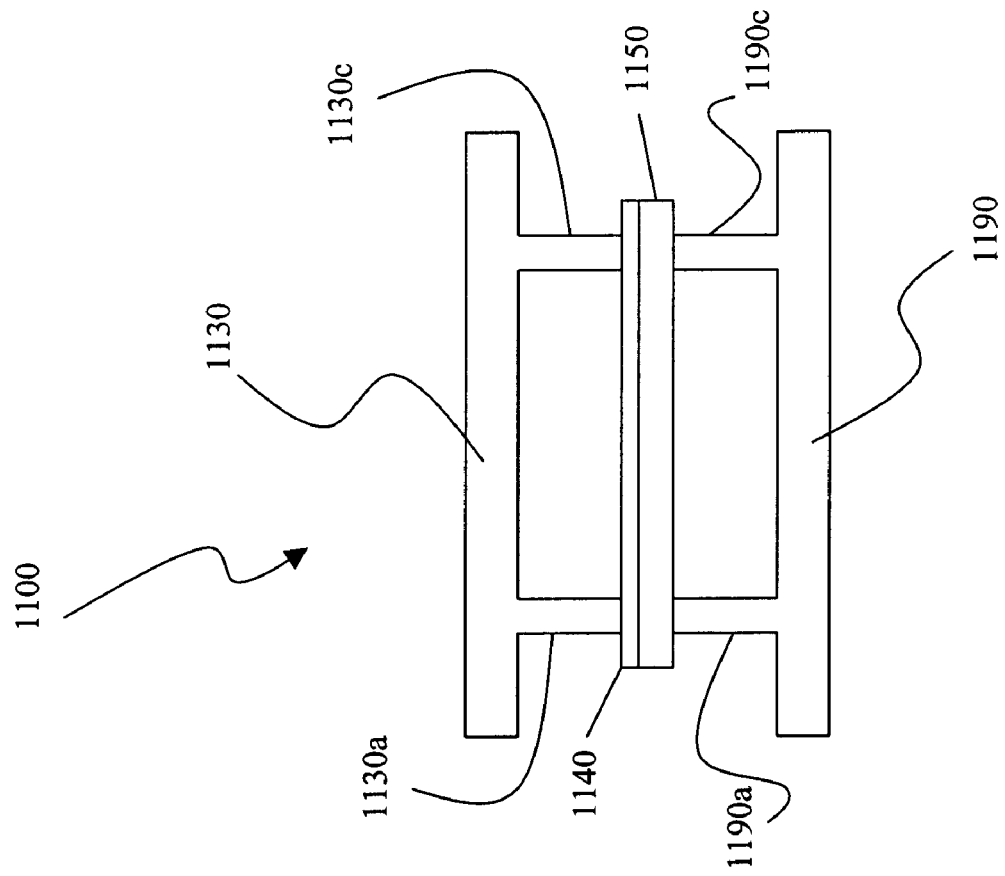
FIG. 11a is a cross sectional side view of a PLC device in accordance with an embodiment of the instant invention, including an upper support structure.

With reference to FIGS. 11*a* and 11*b*, a packaged PLC 1100, in accordance with another embodiment of the instant invention, includes an optical layer 1140, e.g. polymer, deposited on a substrate 1150. Within the optical layer 1140 are optical waveguides 1110 that form a PLC, e.g. an AWG. The substrate 1150 is mounted above a base 1190. More specifically, the substrate 1150 is attached with adhesive (not shown) to the base 1190 via four walls 1190*a*, 1190*b*, 1190*c*, and 1190*d*, which extend from the package base 1190 to the ends of the substrate 1150, e.g. to the outer edges of the lower surface of the substrate 1150 or any positions on the undersurface of the substrate 1150 creating a gap therebetween. The walls 1190*a* to 1190*d* are contiguous with the base 1190 and with each other forming an air gap therebetween and with the substrate 1150. Preferably, the walls 1190*a* and 1190*c* are parallel to each other and perpendicular to walls 1190*b* and 1190*d*; however, the walls 1190*a* to 1190*d* could form separate wall portions and have any desired orientation depending on optical requirements. For exemplary purposes the walls 1190*a* to 1190*d* are shown attached to the periphery of the substrate 1150; however, other designs are also possible. Another support structure 1130 is mounted to the top of the substrate 1150. More specifically, the support structure 1130 is attached with adhesive (not shown) to the optical layer 1140 via four walls 1130*a*, 1130*b*, 1130*c*, and 1130*d*, which extend from the support structure 1130 to the ends of the optical layer 1140, i.e. to the outer edges of the upper surface of the optical layer 1140. The walls 1130*a* to 1130*d* are contiguous with the support structure 1130 and with each other forming an air gap therebetween and with the optical layer 1140. Preferably, the walls 1130*a* and 1130*c* are parallel to each other and perpendicular to walls 1130*b* and 1130*d*; however, the walls 1130*a* to 1130*d* could form separate wall portions and have any desired shape, dimension or orientation depending on optical requirements. For exemplary purposes the walls 1130*a* to 1130*d* are shown attached to the periphery of the optical layer 1140; however, other designs are also possible. Optionally, an enclosure (not shown) surrounds the support structure 1130 and package base 1190.

In operation, increases in ambient temperature cause the base 1190 and the support structure 1130 to expand, and thus for the distance between the walls 1190*a* and 1190*c*, 1190*b* and 1190*d*, 1130*a* and 1130*c*, and 1130*b* and 1130*d* to increase. Similarly, the substrate 1150 and the optical layer 1140 are also subject to expansion. However, since the base 1190 and the support structure 1130 have a higher coefficient of expansion than the substrate 1150 and the optical layer 1140, the substrate 1150 and optical layer 1140, will be subject to a tensile stress that forces them to expand more than they normally would. This stress induces a positive refractive index change in the optical layer 1140 that at least partially compensates the negative refractive index change caused by the increased temperature.

Advantageously, the base 1190 and the support structure 1130 are designed to be roughly similar so that they cooperate to pull the PLC 1100, i.e. the optical layer and substrate, in approximately equal amounts, in each of the lateral directions. Accordingly, the PLC 1100 will be forced to remain planar and the induced stress will occur mainly in the plane of the PLC 1100, or in a plane parallel to the PLC 1100, e.g. the plane of the PLC 1100 in FIG. 11*b*.

A packaged PLC 1200 in accordance with yet another embodiment of the present invention is illustrated in FIGS. 12*a* and 12*b*, and includes an optical layer 1240, e.g. polymer, deposited on a substrate 1250. Within the optical layer 1240 are optical waveguides 1210 that form an AWG. The substrate 1250 is mounted above a base 1290. More specifically, the substrate 1250 is attached with adhesive (not shown) to the base 1290 via two wall portions 1290*a* and 1290*c*, which extend from the package base 1290 to opposite ends of the substrate 1250, e.g. to the outer edges of the lower surface of the substrate 1250. The walls 1290*a* and 1290*c* are contiguous with the base 1290 forming an air gap therebetween and with the substrate 1250. Preferably, the walls 1290*a* and 1290*c* are parallel to each other; however, the walls 1290*a* and 1290*c* could have any desired shape, dimension or orientation depending on optical requirements. For exemplary purposes the walls 1290*a* and 1290*c* are shown attached to the periphery of the substrate 1250; however, other designs are also possible. A stiffening plate 1280 is attached to the top of the optical layer 1240, and a support structure 1230 is mounted to the top of the stiffening plate 1280. More specifically, the support structure 1230 is attached with adhesive (not shown) to the plate 1280 via two walls 1230*a* and 1230*c*, which extend from the support structure 1230 to opposite ends of the stiffening plate 1280, i.e. to the outer edges of the lower surface of the stiffening plate 1280. The walls 1230*a* and 1230*d* are contiguous with the support structure 1230 forming an air gap therebetween and with the stiffening plate 1280. Preferably, the walls 1230*a* and 1230*c* are parallel to each other; however, the walls 1230*a* and 1230*c* could have any desired orientation depending on optical requirements. For exemplary purposes the walls 1230*a* and 1230*c* are shown attached to the periphery of the stiffening plate 1280; however, other designs are also possible. Optionally, an enclosure (not shown) surrounds the support structure 1230 and the package base 1290.

In operation, increases in ambient temperature cause the base 1290 and the support structure 1230 to expand, and thus for the distance between the walls 1290*a* and 1290*c*, and 1230*a* and 1230*c* to increase. Similarly, the substrate 1250, the optical layer 1240, and the stiffening plate 1280 also subject to expansion. However, since the base 1290 and the support structure 1230 have a higher coefficient of expansion than the substrate 1250, optical layer 1240, and stiffening plate 1280, the latter three will be subject to a tensile stress that forces them to expand more than they normally would. This stress induces a positive refractive index change in the optical layer 1240 that at least partially compensates the negative refractive index change caused by the increased temperature.

Advantageously, the base 1290 and the support structure 1230 are designed to be roughly similar so that they cooperate to pull the substrate 1250 and the stiffening plate 1280 in approximately equal amounts. Moreover, since the stiffening plate 1280 is designed with a thickness that is substantially the same as the substrate 1250 thickness, the optical layer 1240 will experience similar forces from both top and bottom layers. Furthermore, since the top and bottom support structures 1230 and 1290 are positioned on opposite sides of the optical layer 1240, they cooperate to further reduce the chance of the optical layer 1240 bending. Accordingly, the AWG will be forced to remain planar and the induced stress will occur mainly in the plane of the AWG, or in a plane parallel to the AWG, e.g., the plane of FIG. 12b.

Notably, in each of the above-described embodiments, the optical layer 1240 has preferably been polymer-based. Although the instant invention is particularly advantageous for optical layers exhibiting a relatively large and negative thermo-optic coefficient, it is also applicable to PLC devices based on other materials, such as silica. For example in one embodiment, a silica-based optical layer supported on a substrate is mounted to a package base that has a negative coefficient of thermal expansion. Upon small increases in temperature the silica-based optical layer and substrate tend to expand, while the distance between walls of the package base tend to decrease. As a result, the substrate and optical layer are subject to a compressive stress that forces them to contract (or at least not expand as much as they normally would). This compressive stress induces a negative refractive index change in the optical layer that at least partially compensates the positive refractive index change caused by the increased temperature.

In accordance with another aspect of the present invention a PLC device comprises: two or more planar lightwave circuits, i.e. two or more planar lightwave circuits packaged inside the same enclosure, including one or more optical layers each and one or more substrates supporting the optical layers, each substrate having a first coefficient of thermal expansion; and a package base including one or more supports for suspending each PLC above a portion of the package base. The package base has a second coefficient of thermal expansion that differs from the first coefficients of thermal expansion, such that a change in temperature causes the support to apply one of a compressive and a tensile force to each planar lightwave circuit in a plane of the planar lightwave circuit. Notably, the support structures attached to the package base may have a third coefficient of thermal expansion. The package base support structure suspending the substrate of each PLC may be of different physical size, shape and material to induce different forces in the optical layers of each PLC, even though the temperature of each PLC may be the same. Advantageously, these different forces induce different stress values to produce desirable changes in the performance characteristics of each PLC.

Figure 13:
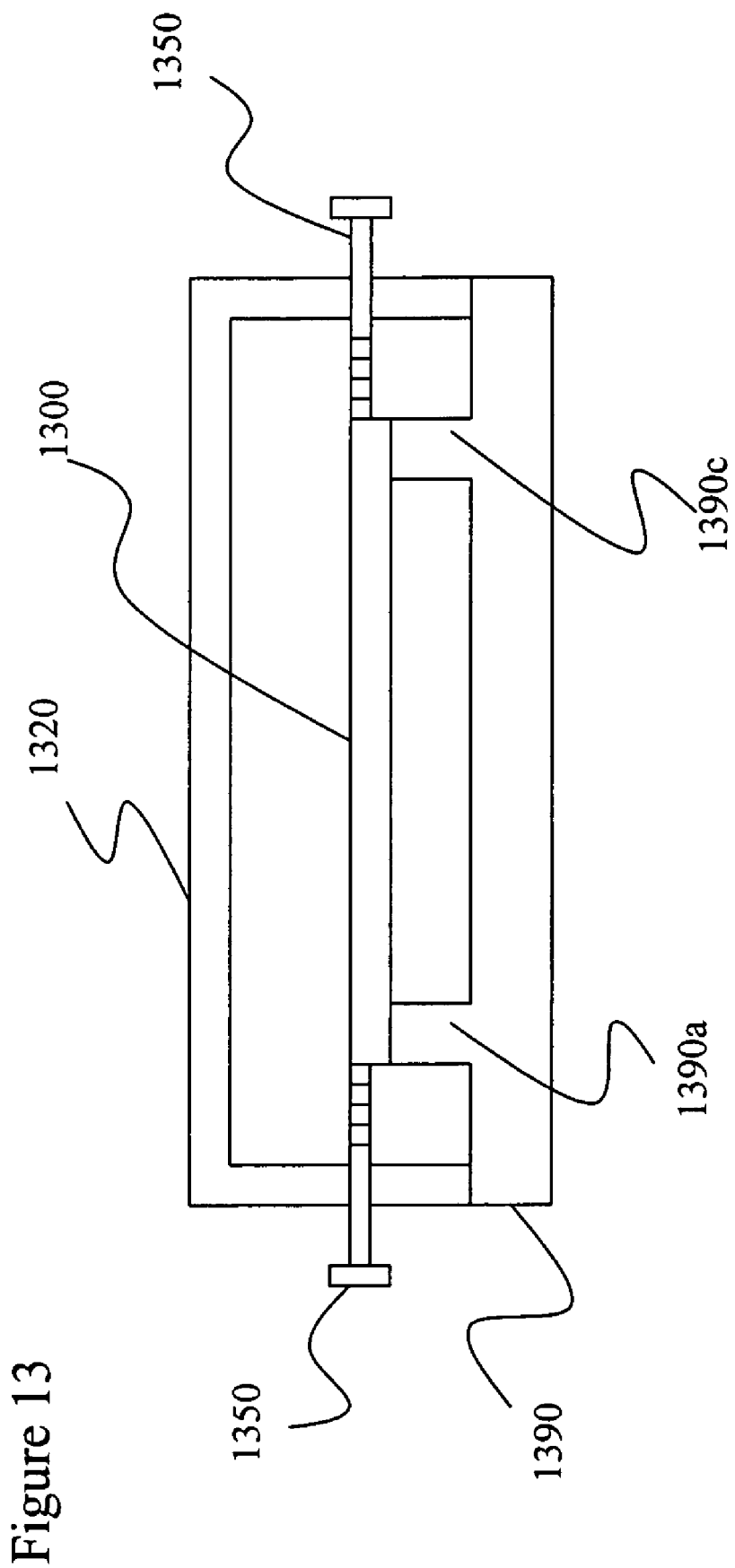
FIG. 13 is a side view of a PLC device according to the present invention with a mechanical pre-stressing device.

This technique also applies to cases in which the stress is deliberately induced into the device during the manufacturing assembly process ("pre-stress") by attaching the PLC substrate to the support structure at one of higher or lower temperature than the room temperature or other operating temperature of the PLC device, and any additional stress that may be applied to either the substrate or support structures through mechanical means, including piezo actuators, screws, etc. In this way, the PLC is subjected to a controlled amount of pre-stress at room temperature or other operating temperature to achieve the desired performance characteristics at the operating temperature. With reference to FIG. 13, a PLC 1300, which is supported above a base 1390 by wall portions, two of which are shown 1390a and 1390c, and enclosed in housing cover 1320, can be subjected to mechanical stresses via actuators 1350, e.g. screws, applying a tensile or a compressive force thereto.

Figure 14:
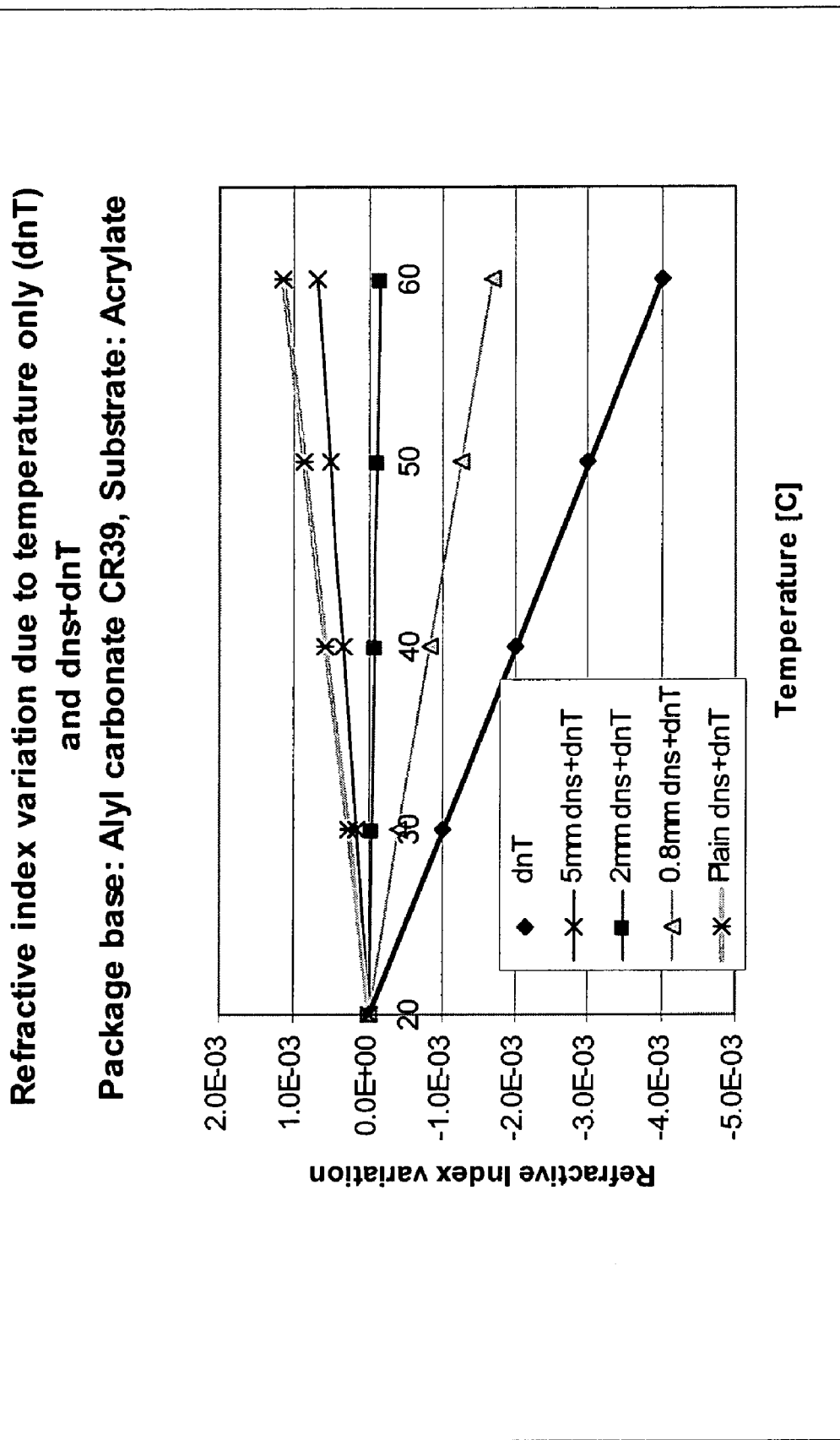
FIG. 14 is a plot of refractive index variation vs temperature for a variety of wall thicknesses.

FIG. 14 presents simulation results of this aspect of the present invention, and illustrates the compensation of $\Delta n_T$ (dnT) through package induced stress for a package base and four rectangular support walls made of allyl carbonate and for a PLC substrate made of acrylate, which is CTE matched with the optical polymer. The package base and walls have a coefficient of thermal expansion CTE=$210 \times 10^{-6}$ C$^{-1}$ and Young's Modulus E=$2.7 \times 10^9$ Pa. The substrate material has CTE=$50 \times 10^{-6}$ C$^{-1}$ and E=$2.4 \times 10^9$. The package base walls are 1.6 mm high and have thickness varying between 0.8 mm and 5.0 mm. The case of a solid (plain) supporting platform is also illustrated. The plot of refractive index variation $\Delta n_T + n_S$ (dnS+dnT) as a function of temperature illustrates the cases from partial thermal compensation (when the slope is negative) to total compensation (when the slope is equal to zero), to overcompensation (when the slope is positive) as the wall thickness is varied. Note that the compensation relies on the stress being induced from the support walls to the substrate in the plane of the substrate/optical layer to create tensile rather than compressive stress. It can be shown that the compensation is maximized when the amount of non-planar deformation of the substrate is minimized.

Figure 15A:
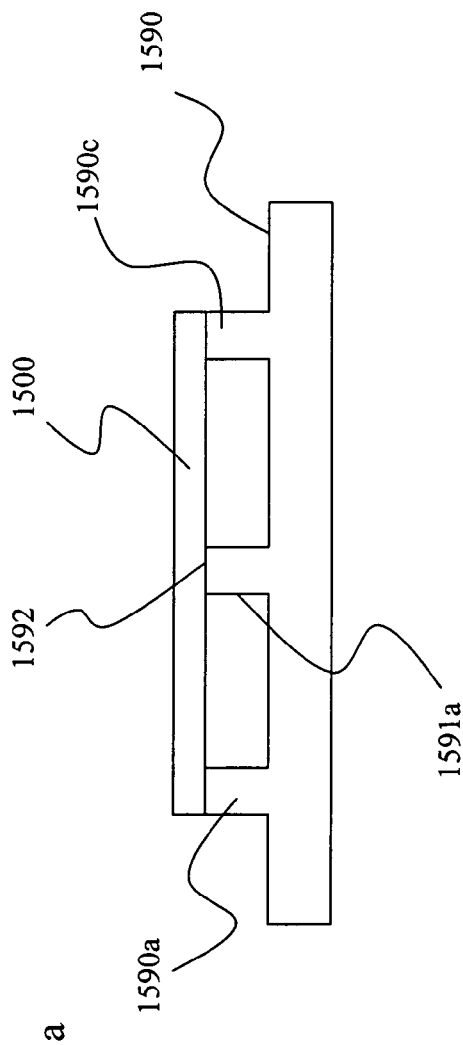
FIG. 15a is a side view of a PLC device according to the present invention with a partially unattached support structure.
Figure 15B:
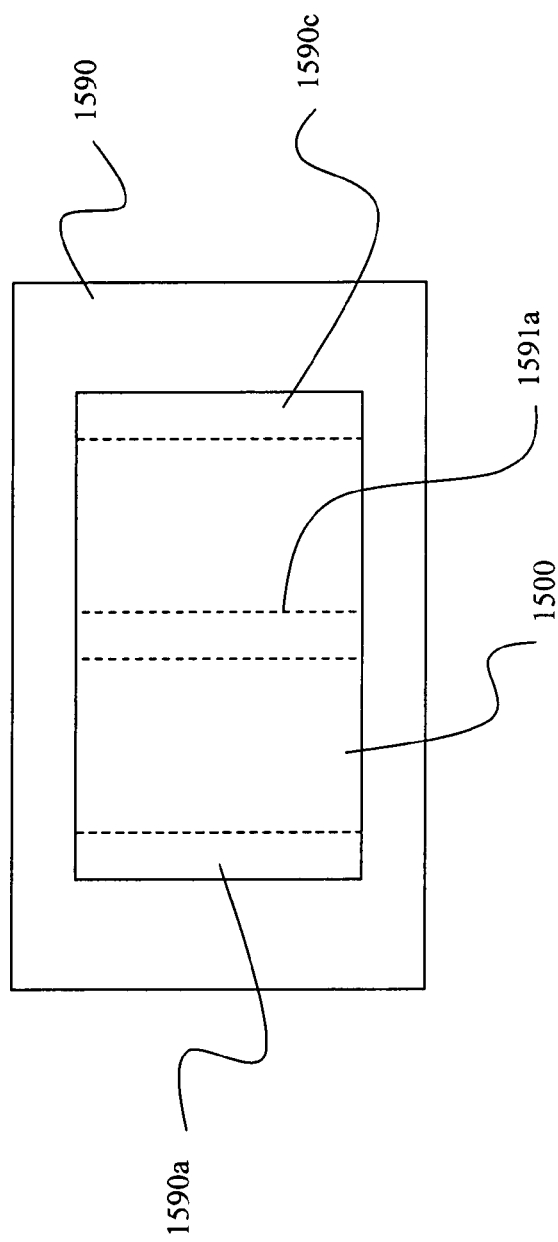

With reference to FIGS. 15a to 15e, to ensure that the stress is induced in the plane of the PLC 1500, an unattached transverse rib wall 1591, extending from the base 1590, is provided between supporting walls 1590a and 1590c. The transverse rib wall 1591 is the same height as the supporting walls 1590a and 1590c, but there is no adhesive at joint 1592 to fix the rib wall 1591 to the PLC 1500, i.e. the PLC 1500 floats freely on the transverse rib wall 1591. FIG. 15c illustrates the embodiment in which four supporting walls 1590a to 1590d are provided to induce stress to the PLC 1500, while unattached transverse rib wall 1591 provides free floating support in the middle thereof. A longitudinal rib wall 1592, perpendicular to the transverse rib wall 1591, is provided in the embodiments illustrated in FIGS. 15d and 15e to add extra support to the PLC 1500. The longitudinal rib wall 1592 extends along the longitudinal axis of the PLC 1500 without being fixed thereto. The longitudinal and transverse rib walls 1592 and 1591, respectively, help maintain the planar lightwave circuit 1500 planar, thereby ensuring that the majority of the stress is induced in the plane of the optical layer.

Figure 16A:
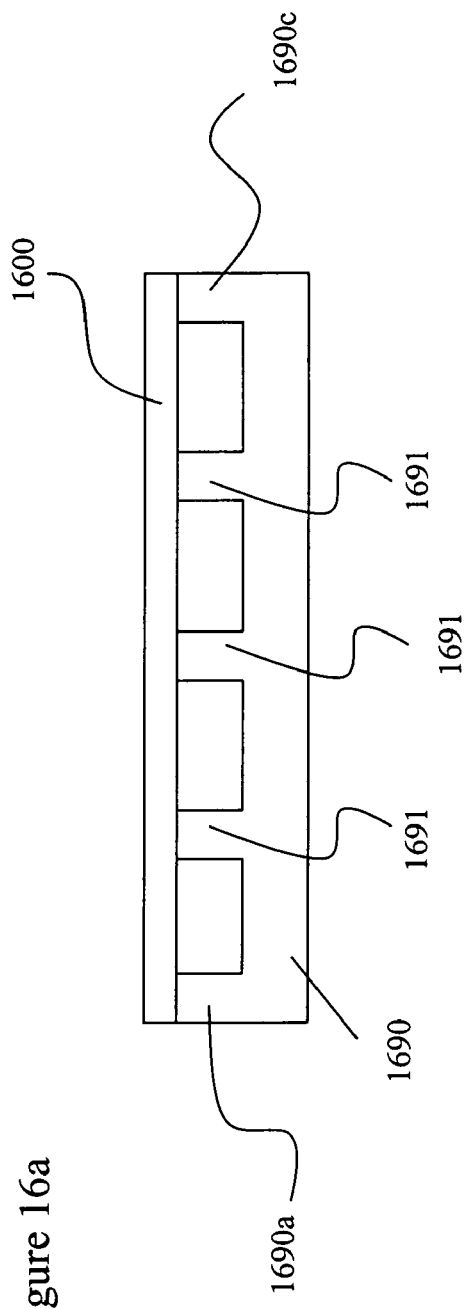
FIG. 16a is a side view of a PLC device according to the present invention with another partially unattached support structure.
Figure 16B:
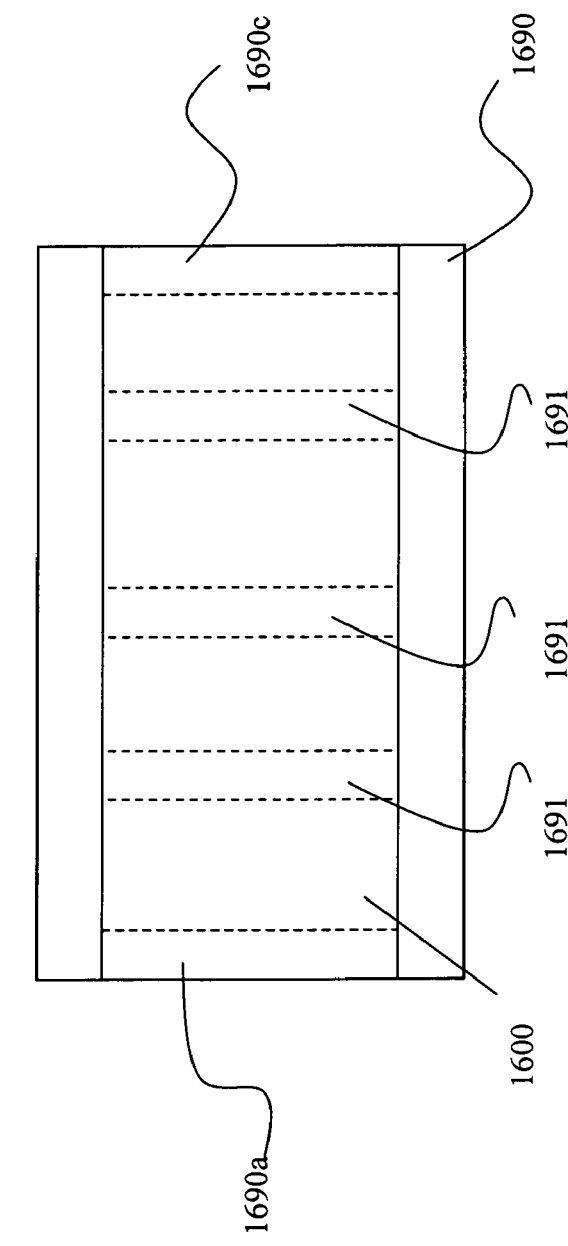

Several transverse rib walls 1691 are provided between supporting walls 1690a and 1690c for supporting a PLC 1600 without being fixed thereto, in the embodiment illustrated in FIGS. 16a to 16d. In FIGS. 16c and 16d side supporting walls 1690b and 1690d are fixed to the PLC 1600 along with supporting walls 1690a and 1690c. A longitudinal rib wall 1692, unattached to the PLC 1600, is provided, as in FIG. 16d, for providing additional support to the PLC 1600 to minimize non-planar deformation thereof.

FIG. 16e to 16h illustrate alternative embodiments of rib wall configurations according to the present invention. In FIG. 16e several transverse partial walls 1693 extend from the base 1690 into contact with the underside of the PLC 1600 without being fixed thereto. The partial transverse walls 1693 do not extend fully across the width of the PLC 1600, but still prevent non-planar deformation from occurring therein. Large rectangular pedestal ribs 1694 extend from the base 1690 to the PLC 1600, but unattached thereto, in the air gap between supporting walls 1690a to 1690d, see FIG. 16f, for supporting the middle of the PLC 1600 during expansion and contraction thereof to minimize non-planar deformations. Alternatively, several smaller longitudinally extending rectangular pedestal ribs 1695 or laterally extending rectangular pedestal ribs 1696 can be provided for supporting the PLC 1600, which freely moves relative thereto (FIG. 16g). In the embodiment illustrated in FIG. 16h, large hollow rectangular pedestal ribs 1697 extend from the base 1690 for supporting the PLC 1600, without being attached thereto, during expansion and contraction thereof.

Furthermore, in each of the above-described embodiments, the instant invention has been described with reference to AWGs for exemplary purposes. It is also within the scope of the instant invention to use other PLCs, such as those including a modulator, an optical switch, and/or a wavelength multiplexer/demultiplexer. Moreover, it is also within the scope of the instant invention for the substrate to be fabricated from a material other than plastic (polymer).

The embodiments of the invention described above are intended to be exemplary only. The scope of the invention is therefore intended to be limited solely by the scope of the appended claims.

The invention claimed is:

1. A planar lightwave circuit device comprising:
    a planar lightwave circuit including:
        an optical layer having a lightwave circuit substantially disposed in a plane, and
        a substrate supporting the optical layer, the substrate having a first coefficient of thermal expansion; and
    stress applying means for inducing one of a compressive and a tensile stress to the optical layer in the plane thereof for modifying a performance characteristic of the planar lightwave circuit;
    wherein the stress applying means comprises a package base including a first support structure for suspending the planar lightwave circuit above a portion of the package base, the package base having a second coefficient of thermal expansion that differs from the first coefficient of thermal expansion, whereby a change in temperature causes the first support structure to induce one of a compressive and a tensile stress in the plane or parallel to the plane of the optical layer; and
    wherein the first support structure comprises: a first support wall portion extending from the package base to the planar lightwave circuit, and a second support wall portion extending from the package base to the planar lightwave circuit, defining a gap therebetween.

2. The planar lightwave circuit device according to claim 1, wherein substantially all of the induced stress is induced in the plane or parallel to the plane of the optical layer.

3. The PLC circuit according to claim 1, wherein the compressive or tensile stress causes an expansion or a contraction of the optical layer in a direction which is within the plane of the optical layer.

4. The planar lightwave circuit according to claim 1, wherein the first and second wall portions are for applying first and second forces, respectively, in different directions to each other in the plane or parallel to plane of the optical layer.

5. The planar lightwave circuit device according to claim 1, wherein the stress changes a refractive index of the optical layer to at least partially compensate for a change in refractive index caused by the change in temperature.

6. The planar lightwave circuit device according to claim 5, wherein the optical layer comprises a polymer; whereby the optical layer exhibits a negative refractive index change with temperature, which is at least partially compensated for by a positive refractive index change caused by the first support structure inducing stress in the optical layer with the change in temperature.

7. The planar lightwave circuit device according to claim 1, wherein the first and second support wall portions are arcuate.

8. The planar lightwave circuit device according to claim 1, wherein the first support structure comprises four support walls, each of the four support walls coupled to a different end of the planar lightwave circuit.

9. The planar lightwave circuit device according to claim 1, wherein the support structure comprises an annular ring.

10. The planar lightwave circuit device according to claim 1, wherein the package base and the support structure comprise a monolithic element.

11. The planar lightwave circuit device according to claim 1, further comprising planar maintaining means for reducing non-planar deformation of the planar lightwave circuit.

12. The planar lightwave circuit device according to claim 11, wherein the planar maintaining means comprises a stiffening plate forming part of the planar lightwave circuit having a third coefficient of thermal expansion coupled to the substrate opposite the optical layer.

13. The planar lightwave circuit device according to claim 12, wherein the third coefficient of thermal expansion is greater than the first coefficient of thermal expansion and less than the second coefficient of thermal expansion.

14. The planar lightwave circuit device according to claim 11, wherein the planar maintaining means comprises a second support structure mounted on the planar lightwave circuit opposite the first support structure, the second support structure including a first support wall portion for contacting the first end of the planar lightwave circuit, and a second support wall portion for contacting the second opposite end of the planar lightwave circuit, defining a gap therebetween.

15. The planar lightwave circuit device according to claim 1, wherein the stress applying means includes a heating element for adjusting the temperature of the package base causing expansion or contraction thereof for applying stress to the planar lightwave circuit for dynamic tuning of a performance characteristics selected from the group consisting of refractive index, birefringence, wavelength shift, insertion loss, and optical mode profile control.

16. The planar lightwave circuit device according to claim 15, wherein the heating element comprises a Peltier heating element having a hot side and a cold side; wherein the hot side is adjacent the package base for applying a refractive index change to the optical layer.

17. The planar lightwave circuit device according to claim 15, wherein the heating element comprises a Peltier heating element having a hot side and a cold side; wherein the cold side is adjacent the package base for applying a refractive index change to the optical layer.

18. The planar lightwave circuit device according to claim 1, wherein the stress applying means includes a package base with a first support structure, which is pre-stressed relative to the planar lightwave circuit by attaching the planar lightwave circuit to the package base at a higher or lower temperature than room temperature or other operating temperature of the planar lightwave circuit, whereby at ambient temperature the first support structure induces one of a compressive and a tensile stress in the plane or parallel to the plane of the optical layer.

19. The planar lightwave circuit device according to claim 1, wherein the stress applying means comprises mechanical stressing means for applying one of a compressive and a tensile force in the plane or parallel to the plane of the planar optical layer for dynamic tuning of a performance characteristics selected from the group consisting of birefringence, wavelength shift, insertion loss, and optical mode profile control.

20. The planar lightwave circuit device according to claim 1, wherein the first support structure comprises four support walls, each of the four support walls coupled to a different portion of the planar lightwave circuit.

21. A planar lightwave circuit device comprising:
a planar lightwave circuit including:
an optical layer having a lightwave circuit substantially disposed in a plane, and
a substrate supporting the optical layer, the substrate having a first coefficient of thermal expansion; and
stress applying means for inducing one of a compressive and a tensile stress to the optical layer in the plane thereof for modifying a performance characteristic of the planar lightwave circuit;
wherein the stress applying means comprises a package base including a first support structure for suspending the planar lightwave circuit above a portion of the package base, the package base having a second coefficient of thermal expansion that differs from the first coefficient of thermal expansion, whereby a change in temperature causes the first support structure to induce one of a compressive and a tensile stress in the plane or parallel to the plane of the optical layer; and
wherein the first support structure comprises: a first support wall portion extending from the package base to the planar lightwave circuit, and a second support wall portion extending from the package base to the planar lightwave circuit, defining a gap therebetween;
further comprising planar maintaining means for reducing non-planar deformation of the planar lightwave circuit;
wherein the planar maintaining means comprises supporting rib means extending from the package base into contact with the planar lightwave circuit between the first and second supporting wall portions; wherein the planar lightwave circuit is freely floating on the supporting rib for minimizing non-planar deformation.

22. The planar lightwave circuit device according to claim 21, wherein the supporting rib means comprises one or more of the supporting ribs selected from the group consisting of: a transverse rib extending substantially parallel to the first and second supporting wall portions, a longitudinal rib extending substantially perpendicular to the first and second supporting wall portions, a solid pedestal rib, and a hollow pedestal rib.

23. A planar lightwave circuit device comprising:
a planar lightwave circuit including:
an optical layer having a lightwave circuit substantially disposed in a plane, and
a substrate supporting the optical layer, the substrate having a first coefficient of thermal expansion; and
stress applying means for inducing one of a compressive and a tensile stress to the optical layer in the plane thereof for modifying a performance characteristic of the planar lightwave circuit;
wherein the stress applying means comprises a package base including a first support structure for suspending the planar lightwave circuit above a portion of the package base, the package base having a second coefficient of thermal expansion that differs from the first coefficient of thermal expansion, whereby a change in temperature causes the first support structure to induce one of a compressive and a tensile stress in the plane or parallel to the plane of the optical layer; and
further comprising an additional planar lightwave circuit mounted on the package base, the additional planar lightwave circuit including an optical layer having a lightwave circuit, and a substrate supporting the optical layer, the substrate having a coefficient of thermal expansion different than the first or the second coefficient of thermal expansion, whereby a change in temperature results in the package base inducing a different amount of stress to the different planar lightwave circuits.

24. A method of modifying a performance characteristic of a planar lightwave circuit including: an optical layer having a lightwave circuit defining a plane, and a substrate supporting the optical layer, the substrate having a first coefficient of thermal expansion, the method comprising the steps of:
a) inducing one of a compressive and a tensile stress for modifying a performance characteristic of the planar lightwave circuit; wherein substantially all of the applied stress is induced in the plane or parallel to the plane of the optical layer
wherein step a) comprises mounting the planar lightwave circuit onto packaging; and
wherein the packaging comprises a package base including a first support structure for suspending the planar lightwave circuit above a portion of the package base, the package base having a second coefficient of thermal expansion that differs from the first coefficient of thermal expansion, whereby a change in temperature causes the first support structure to induce one of a compressive and a tensile stress in the plane or parallel to the plane of the optical layer
wherein the first support structure comprises a first support wall portion extending from the package base to the planar lightwave circuit, and a second support wall portion extending from the package base to the planar lightwave circuit, defining a gap therebetween.

25. The method according to claim 24, wherein the stress changes a refractive index of the optical layer to at least partially compensate for a change in refractive index caused by the change in temperature.

26. The method according to claim 24, further comprising the step of reducing non-planar deformation of the planar lightwave circuit.

27. The method according to claim 26, wherein the step of reducing non-planar deformation comprises mounting a second support structure on the planar lightwave circuit opposite the first support structure, the second support structure including a first support wall portion for contacting the first end of the planar lightwave circuit, and a second support wall portion for contacting the second opposite end of the planar lightwave circuit, defining a gap therebetween.

28. The method according to claim 26, wherein the step of reducing non-planar deformation comprises providing planar maintaining means;
  wherein the planar maintaining means comprises supporting rib means extending from the package base into contact with the planar lightwave circuit between the first and second supporting wall portions; wherein the planar lightwave circuit is freely floating on
  the supporting rib for minimizing non-planar deformation.

29. The method according to claim 24, wherein step a) includes adjusting the temperature of the package base causing expansion or contraction thereof for inducing stress in the planar lightwave circuit for dynamic tuning of a performance characteristic selected from the group consisting of refractive index, birefringence, wavelength shift, insertion loss, and optical mode profile control.

30. The method according to claim 24, wherein step a) includes pre-stressing the package base relative to the planar lightwave circuit by attaching the planar lightwave circuit to the package base at a higher or lower temperature than room temperature or other operating temperature of the planar lightwave circuit, whereby at ambient temperature the first support structure induces one of a compressive and a tensile stress in the plane or parallel to the plane of the optical layer.

* * * * *